United States Patent [19]
Tachita

[11] Patent Number: 5,847,678
[45] Date of Patent: Dec. 8, 1998

[54] GPS RECEIVER

[75] Inventor: Ryobun Tachita, Kawasaki, Japan

[73] Assignee: Matsushita Electric Industrial Co., Ltd., Osaka, Japan

[21] Appl. No.: 857,597

[22] Filed: May 16, 1997

[30] Foreign Application Priority Data

May 17, 1996 [JP] Japan .................................. 8-146464

[51] Int. Cl.$^6$ .............................................. H04B 7/185
[52] U.S. Cl. .......................................... 342/357; 375/208
[58] Field of Search ........................... 375/208; 342/352, 342/357

[56] References Cited

U.S. PATENT DOCUMENTS

| | | |
|---|---|---|
| 5,081,462 | 1/1992 | Tachita et al. . |
| 5,101,416 | 3/1992 | Fenton et al. . |
| 5,402,441 | 3/1995 | Washizu et al. .................. 375/208 |
| 5,691,974 | 11/1997 | Zehavi et al. .................. 375/208 X |
| 5,757,767 | 5/1998 | Zehavi .................. 370/208 |

FOREIGN PATENT DOCUMENTS 4-020889   1/1992  Japan .
4-269682   9/1992  Japan .

*Primary Examiner*—Mark Hellner
*Attorney, Agent, or Firm*—Lowe Hauptman Gopstein Gilman & Berner

[57] ABSTRACT

A GPS receiver including a receiving portion for receiving a GPS signal, a PN code signal generator, a correlation detector including a reproduced carrier signal generator, and a phase difference detector is disclosed. A frequency and a phase of the reproduced carrier signal are controlled according to a correlation result to track the carrier signal in the GPS signal, the PN code signal generator generates the PN code with a phase thereof controlled by phase control data from the correlation result, and amplitudes of the GPS signal is repeatedly sampled at timings with a deviation from an edge of PN code signal from the PN code signal generator varied. A zero-cross point on the variation of the sampled amplitudes provides a phase difference. The total phase difference is derived by summing the phase control data and the phase difference. To more accurately detect the phase difference, an interpolation may be effected. The sampling timings may be collectively generated as a train of sampling signal. The variation may be stored to estimate the receiving condition, so that the phase controlling may be effected adaptively.

11 Claims, 13 Drawing Sheets

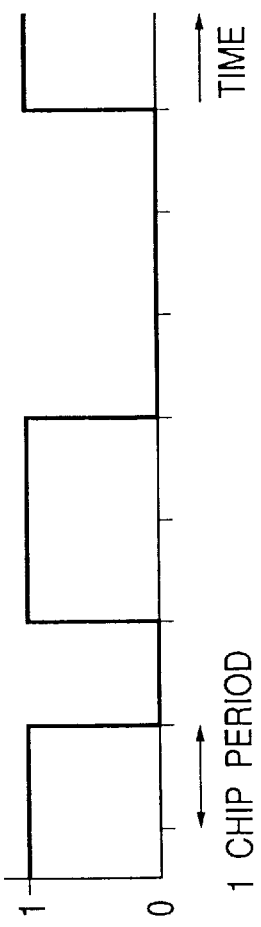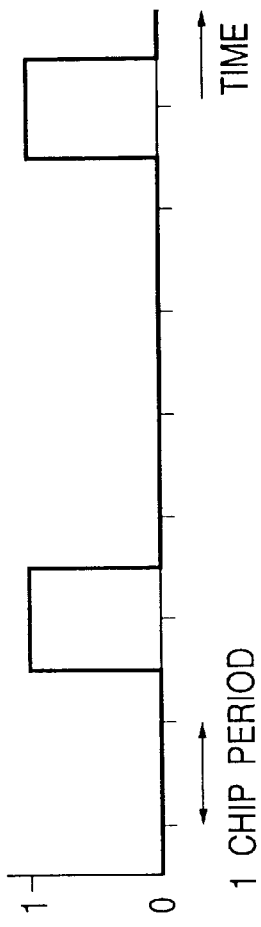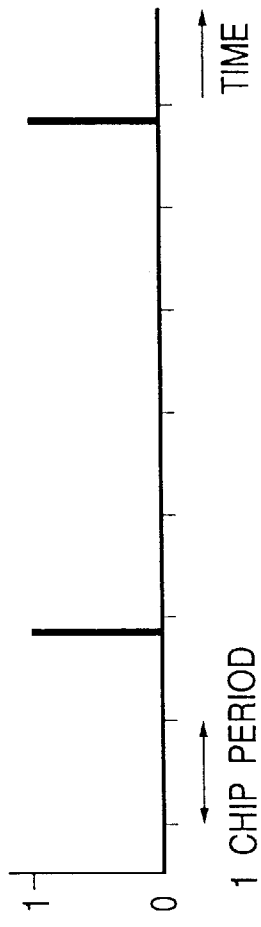

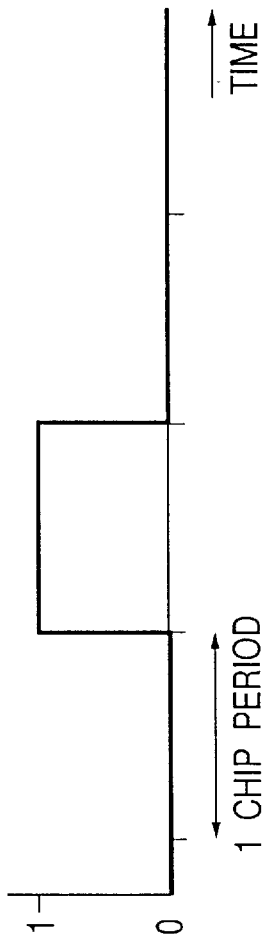
FIG. 6A OUTPUT OF LATCH 128
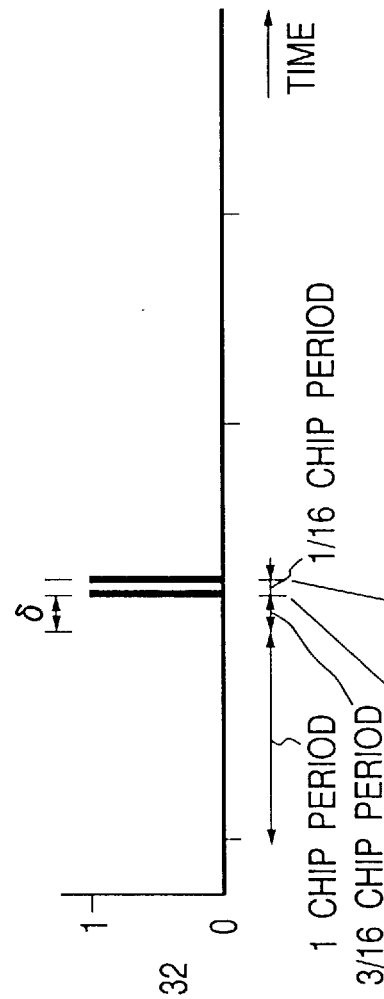
FIG. 6B OUTPUT OF AND GATE 132
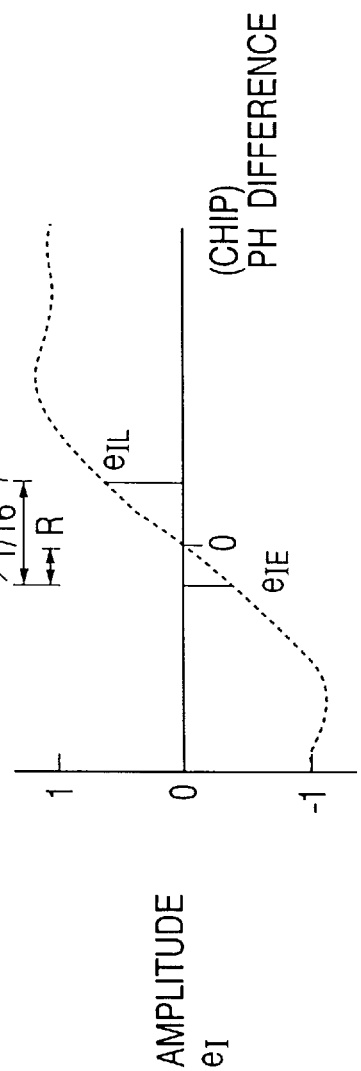
FIG. 6C AMPLITUDE $e_I$

GPS RECEIVER

BACKGROUND OF THE INVENTION

1. Field of the Invention

This invention relates to a GPS (Global Positioning System) receiver for receiving a GPS signal from a GPS satellite and outputting measured phase difference data.

2. Description of the Prior Art

A GPS (Global Positioning System) receiver for receiving a GPS signal from a GPS satellite and outputting measured phase difference data is known. U.S. Pat. No. 5,081,462 discloses such a prior art GPS receiver. In this prior art GPS receiver, the phase of the pseudorandom noise code of the satellite signal is computed by the operation based on the preset value and the change value of the pseudorandom noise code and the frequency of the regenerated carrier wave.

U.S. Pat. No. 5,101,416 also discloses a Mutichannel digital receiver for global positioning system.

SUMMARY OF THE INVENTION

The aim of the present invention is to provide an improved GPS receiver.

According to this invention, there is a GPS receiver is provided which comprises: a receiving portion for receiving a GPS (Global Positioning System) signal from a GPS satellite including transmission data, a first pseudo random noise code signal assigned to the GPS satellite, and a first carrier signal and generating I and Q GPS signals; a pseudorandom noise code signal generation portion responsive to phase control data and a clock pulse signal for generating a second pseudorandom noise code signal corresponding to the first pseudorandom noise code signal; a carrier signal generation portion for generating a second carrier signal corresponding to the first carrier signal; a correlation detection portion for providing correlation results $P_I$, $P_Q$ from the I and Q GPS signals, the second carrier signal, and the second pseudorandom noise code signal; a frequency control portion for controlling the carrier signal generation portion in accordance with the correlation result $P_Q$ to track a frequency and phase of the first carrier signal with respect to the second carrier signal; a phase control portion for supplying the phase control data to the pseudorandom noise code signal generation portion to reduce a first phase difference between the first and second pseudorandom noise code signals in accordance with the correlation result $P_Q$ which is obtained while the frequency control portion is tracking the frequency and phase of the first carrier signal; a timing pulse generation portion responsive to the phase control portion for detecting an edge of the second pseudorandom noise code signal and generating a timing pulse with a deviation δ from a timing of the detected edge; a sampling portion for sampling amplitudes of the I and Q GPS signals at a sampling timing in response to the timing pulse; an accumulating portion for accumulating values of the sampled amplitudes to provide amplitude averages $E_I$ and $E_Q$; a second phase difference detection portion for judging whether the sampling timing agrees with the detected edge in accordance with the amplitude averages $E_I$ and $E_Q$ and for repeatedly controlling the timing pulse generation portion, the sampling portion, and the averaging portion with the deviation δ changed around the timing of the edge, for outputting phase difference data when the sampling timing substantially agrees with the detected edge in accordance with the amplitude averages $E_I$ and $E_Q$; a phase difference data outputting portion for summing the phase control data and phase difference data and outputting the summing result; and a data detection portion for detecting and outputting transmission data from the correlation result $P_I$.

In the GPS receiver, the timing pulse generation portion may be further responsive to the clock pulse and generate a second timing pulse following the timing pulse at a second sampling timing with an interval corresponding to the clock period. The GPS receiver may further comprise: a weighting coefficient generation portion for generating first and second weighting coefficients in accordance with the sampling timing and the second sampling timing; and a weighting portion for weighting the I and Q baseband GPS signals by the first and second weighting coefficients, wherein the accumulating portion sums the weighted I and Q baseband GPS signals and accumulates the summing result.

In the GPS receiver, the timing pulse generation portion may generate the timing pulse and a second timing pulse in response to a rising edge and a falling edge of the second pseudorandom noise code signal respectively and further generate an edge period signal indicating of periods of the rising edge and falling edges of the second pseudorandom noise code signal. The GPS receiver may further comprise an inverting portion for inverting the I and Q GPS signals for the period of the falling edge and supplying outputs thereof to the sampling portion, the sampling portion sampling the amplitudes of the I and Q GPS signals in response to the timing pulse and the second timing pulse.

The GPS receiver may further comprise: an inverting portion for inverting the amplitude average $E_I$ and outputting when the correlation result $P_I$ is negative and outputting as it is when the correlation result $P_I$ is not negative; and an averaging portion for averaging the amplitude averages $E_I$ and $E_Q$ from the inverting portion for a transmission period of the GPS signal and supplies an average to the second phase difference detection portion to provide the variation.

In the GPS receiver, the second phase difference detection portion controls the timing pulse generation portion may generate a train of the timing pulses such that the deviation δ successively varied around the timing of the edge, the sampling portion samples the amplitudes of the I and Q GPS signals in response to the train of timing pulses, and the accumulating portion may average values of the sampled amplitudes every timing pulses of the train and outputs the phase difference data when the sampling timing of any of the timing pulse in the train substantially agrees with the detected edge in accordance with the amplitude averages $E_I$ and $E_Q$, which GPS receiver is referred as a second GPS receiver hereinafter.

The second GPS receiver may further comprises a weighting coefficient generation portion for generating first and second weighting coefficients in accordance with the sampling timings of each pair of two consecutive sampling pulses of the train; and a weighting portion for weighting the I and Q baseband GPS signals sampled in response to each pair of the two consecutive sampling timings by the first and second weighting coefficients may be further comprised, wherein the accumulating portion sums the weighted I and Q baseband GPS signals sampled in response to each pair of two consecutive sampling pulses and accumulates the summing results of each pair of two consecutive sampling pulses as the amplitude averages $E_I$ and $E_Q$. In this case, a storing portion for storing data of a variation of the averaged $E_I$ sampled in response to the train of timing pulses; and a comparing portion for comparing data of the variation presently derived with the stored variation of the averaged $E_I$ may be further comprised.

The second GPS receiver may further comprise: a storing portion for storing data of a variation of the averaged $E_f$ sampled in response to the train of timing pulses; and a comparing portion for comparing data of the variation presently derived with the stored variation of the averaged $E_f$, which GPS receiver is referred as a third GPS receiver.

The third GPS receiver may further comprise: a judging portion for Judging that an accuracy of the detected second phase difference is higher than a reference, wherein the weighting coefficient generation portion generates the weighting coefficient using the detected second phase difference having the accuracy higher than the reference, the stored variation of the averaged $E_f$, timings of sampling used for obtaining the variation, and timings for sampling the variation to be detected.

In the third GPS receiver, the timing pulse generation portion may successively generate the timing pulses with the deviation δ varied before the timing of the detected edge by more than one chip period and the storing portion stores the variation, wherein the third GPS receiver may further comprise: a tangent line detection portion for detecting a tangent line on a curve of the variation having a higher inclination; and a calculation portion for calculating an intersecting point with a predetermined level of the amplitude, the storing portion storing the intersecting point, the second phase difference detection portion detecting the second phase difference from a difference between the intersecting point presently provided and the intersecting point stored in the storing portion.

The third GPS receiver may further comprise: an assuming portion for assuming a first phase and the variation of a first component of the first pseudorandom noise code signal which directly arrives at the receiving portion and a second phase and the variation of second component of the first pseudorandom noise code signal which indirectly arrives at the receiving portion in accordance with the stored variation; and a third phase difference detection portion for adjusting the assumed first and second phases and variations of the detecting phases and variations of the first and second components such that the assumed first and second phases and variation of the first and second components correspond to the presently detected variation.

BRIEF DESCRIPTION OF THE DRAWINGS

The object and features of the present invention will become more readily apparent from the following detailed description taken in conjunction with the accompanying drawings in which:

FIGS. 3A to 3C, 4A and 4B show timing charts of the first embodiment for the correlation detector shown in FIG. 1;

FIGS. 6A to 6C illustrate an operation of the correlation detector of the second embodiment;

The same or corresponding elements or parts are designated with like references throughout the drawings.

DETAILED DESCRIPTION OF THE INVENTION

<FIRST EMBODIMENT>

Figure 1:
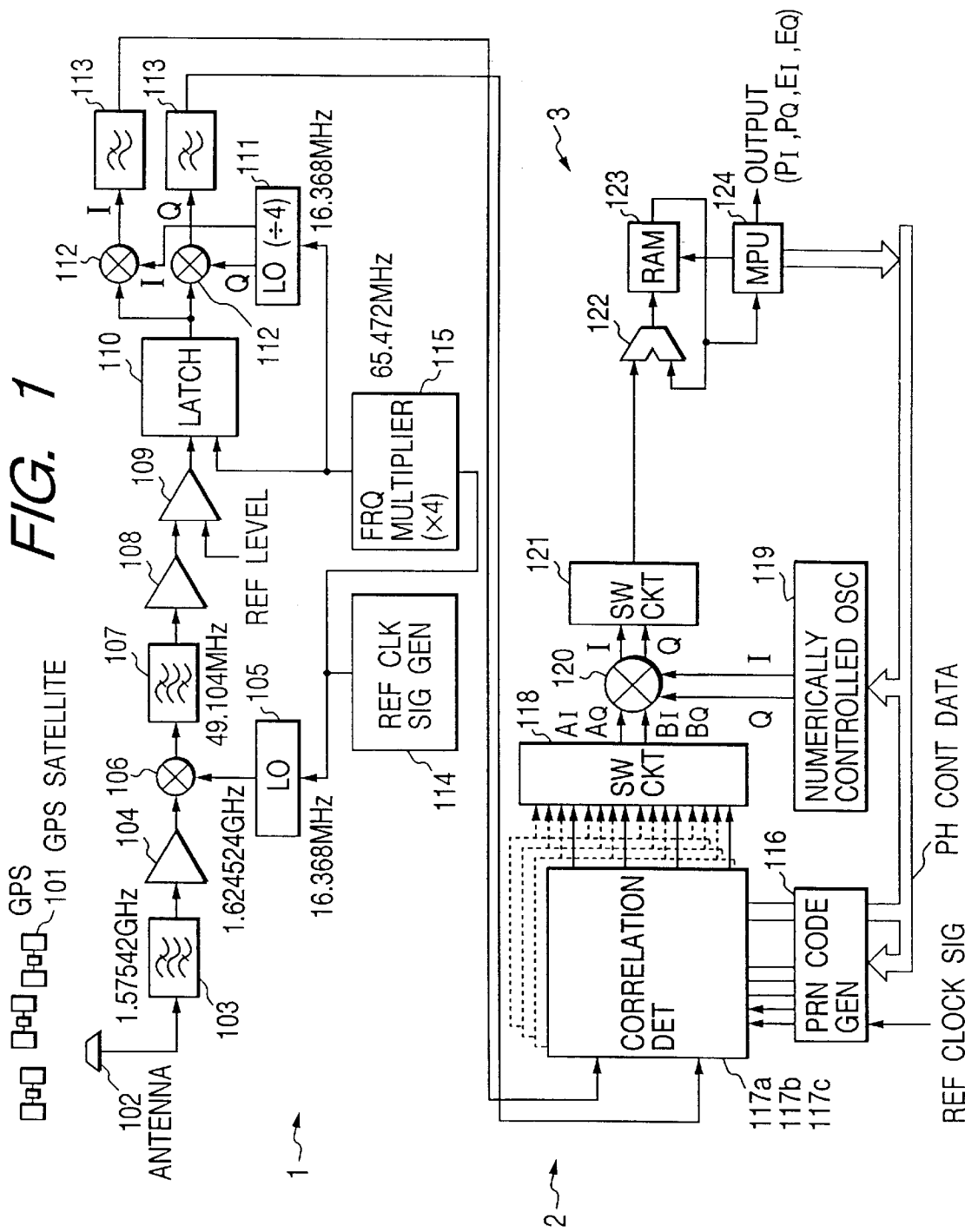
FIG. 1 is a block diagram of a GPS receiver of the present invention.

FIG. 1 is a block diagram of a GPS receiver of the present invention.

The GPS receiver of the first embodiment comprises a receiving portion 1 for receiving a GPS signal including transmission data and a first pseudorandom noise code and generating I and Q GPS baseband signals and a correlation detection portion 2 for outputting a phase difference between the first pseudorandom noise code in the GPS signal and a second pseudorandom noise code generated therein and detected data from one of GPS satellites 101.

The GPS satellite 101 transmits a spectrum spread signal L1 having a carrier frequency of 1.57542 GHz. The GPS signal includes the first pseudorandom noise code which is referred as C/A (Corse Aquisition) code and phase-shifted data having a data rate of 50 bps.

The receiving portion 1 includes an antenna 102 for receiving the GPS signal, a bandpass filter 103 having a center frequency of 1.57542 GHz and a passband of 30 MHz, an amplifier 104 for amplifying an output of the bandpass filter 103, a mixer 106 for mixing an output of the amplifier 104 with a local oscillation signal having 1.624524 GHz for outputting a first intermediate frequency signal having 49.104 MHz, a bandpass filter 107 for limiting the band of the first intermediate frequency signal to 10 MHz, an amplifier 108 for amplifying the first intermediate frequency signal from the bandpass filter 107, a comparator 109 for comparing the first intermediate frequency signal from the amplifier 108 with a reference level to output a binary signal, a latch 110 for sampling the binary signal at a frequency of 65.472 MHz, a local oscillator 111 for outputting quadrature local oscillation signals of 16.368 MHz provided by frequency-dividing a local oscillation signal having a frequency of 65.472 MHz, mixers 112 for mixing the sampled binary signal with the quadrature local oscillation signals to provide quadrature baseband signals, lowpass filters 113 for reducing the sampling frequency to 16.368 MHz and outputting I and Q GPS baseband signals, a reference clock signal generator 114 for generating a reference clock signal of 16.368 MHz, a frequency multiplier having a PLL oscillator for generating a frequency signal of 65.472 MHz supplied to the latch 110 and to the local oscillator 111.

The correlation detection portion 2 for outputting a phase difference between the first pseudorandom noise code in the GPS signal and a second pseudorandom noise code generated therein and detected data from one of GPS satellites 101, comprises a pseudorandom noise code generator 116 for generating pseudorandom noise codes, each corresponding to pseudorandom noise code transmitted by each satellite, correlation detectors 117a, each mixing the pseudorandom noise code with the I and Q GPS baseband signals and integrating the results for a predetermined interval to output correlation results and generating signals including phase information from the I and Q GPS baseband signals every GPS satellite, a switch circuit 118 for sequentially outputting outputs of the correlation detectors every satellite, a numerically controlled oscillator 119 for generating quadrature signals with its frequency numerically-controlled every GPS satellite, a mixer 20 for mixing the outputs of one of the correlation detectors 117a with quadrature signals from the numerically controlled oscillator 119 to remove carrier components from the outputs of the correlation detectors 117a every GPS satellite, a switch circuit 121 for alternately outputting the I and Q outputs of the mixer 120 every GPS satellite, an adder 122 and a RAM (Random access memory) 123 for accumulating respective I and Q outputs every GPS satellite, a control circuit 124 including a microprocessor (MPU) for controlling the pseudorandom noise code generator 116 and the numerically-controlled oscillator 119 to track the GPS signals from respective GPS satellites and outputting a phase difference between the pseudorandom noise code included each received GPS signal and the pseudorandom noise code generated every target GPS satellite and data received from every GPS satellite.

The antenna 102 receives the GPS signals from GPS satellites 101. The bandpass filter 103 bandpass-filters the GPS signals with the center frequency of 1.57542 GHz and the passband of 30 MHz. The amplifier 104 amplifies the output of the bandpass filter 103. The mixer 106 mixes an output of the amplifier 104 with the local oscillation signal having 1.624524 GHz to output the first intermediate frequency GPS signal having 49.104 MHz. The bandpass filter 107 limits the band of the first intermediate frequency signal to 10 MHz. The amplifier 108 amplifies the first intermediate frequency GPS signal from the bandpass filter 107. The comparator 109 compares the first intermediate frequency GPS signal from the amplifier 108 with the reference level to output the binary signal. The latch 110 samples the binary signal at the frequency of 65.472 MHz and converts the binary signal to a second intermediate frequency signal having a center frequency of 16.368 MHz.

The mixers 112 mixes the sampled binary signal with the quadrature local oscillation signals having 16.368 MHz to provide quadrature baseband GPS signals (which are substantially baseband signals, i.e. a carrier component is slightly left which is removed by the numerically controlled oscillator 120). The lowpass filters 113 reduces the sampling frequency to 16.368 MHz and outputs I and Q GPS baseband signals.

The I and Q GPS baseband signals from every GPS satellite are subjected to the correlation detection processing independently.

The pseudorandom noise code generator 116 generates pseudorandom noise codes having a bit rate of 1.023 Mbps, a code length of 1023 chips, and a period of 1 msec. The pseudorandom noise code phase is quantized with the reference clock signal having 16.368 MHz (corresponding to one sixteenth of one chip period) and the quantized values are set to the pseudorandom noise code generator 116. Each pseudorandom noise code corresponds to the pseudorandom noise code uniquely assigned for each satellite. The phases of respective pseudorandom noise codes are controlled with phase control data from the microprocessor 124 every GPS satellite.

Each of the correlation detectors 117a for each GPS satellite inverse-spreads the I and Q GPS baseband signals with the pseudorandom noise code from the pseudorandom noise code generator 116 and smooths the result by integration to output signals $A_I$ and $A_Q$ having a sampling frequency of hundreds KHz and samples the I and Q GPS baseband signals at timings leading or trailing a transition of the pseudorandom noise code generated by the pseudorandom noise code generator 116 from 0 to 1 by a deviation $\delta$ and smooths the sampled values by integration for a period corresponding to a sampling frequency hundreds KHz to output signals $B_I$ and $B_Q$.

The numerically controlled oscillator 119 generates reproduced carrier signals for respective GPS satellites under a control of the microprocessor 124. The mixer 120 quadrature-frequency-converts the output signals of the correlation detector 117a with the I and Q output signals to remove carrier components in the output signals of the correlation detector 117a. In this frequency conversion, the output signals of the correlation detector 117a are processed in a time-division manner every target GPS satellite because the sampling frequency of its input signal is relatively low.

The I and Q components outputted by the mixer 120 are converted into a time sequential signal by the switch circuit 121 and accumulated by an accumulating circuit 3 including an adder 122 and a RAM 123 every target GPS satellite. The values derived by frequency converting and accumulating the signals $A_I$ and $A_Q$ represent correlation results $P_I$ and $P_Q$ and the values derived by frequency-converting and accumulating the signals $B_I$ and $B_Q$ represent amplitude avenge values $E_I$ and $E_Q$ of the received GPS signal at a timing around a rising edge of the pseudorandom noise code from the pseudorandom noise code generator 116. The accumulating period is 1 msec corresponding to the C/A code.

The microprocessor 124 receives the accumulated results and controls the numerically controlled oscillator 119 such that an amplitude of the correlation result $P_Q$ becomes lower to track the carrier from the target GPS satellite. The microprocessor 124 further controls a phase of the pseudorandom noise code by setting phase control data to the pseudorandom noise code generator 116 in accordance with a phase variation in the numerically controlled oscillator 119.

The microprocessor 124 measures the average values of the amplitudes of the received GPS signal at a sampling timing with a deviation $\delta$ and judges the polality and whether the average value is zero or near zero and the the microprocessor 124 further measures the average value if the average value is zero and determines whether the devitaion $\delta$ should be increased or decreased in accordance with the polarity of the average values. Then, the microprocessor 124 measures the average values with the deviation $\delta$ successively changed and determines the value of the deviation $\delta$ when the average value of the amplitudes of the received GPS signal becomes low to determine the phase difference between the pseudorandom noise code from the pseudorandom noise code generator 116 and that from the target GPS satellite under receiving. The microprocessor 124 obtains a total phase difference between the pseudorandom noise code from the pseudorandom noise code generator 116 and that from the received GPS satellite by summing the phase control data set to the pseudorandom noise code generator 116 and the value of the deviation $\delta$.

The microprocessor 124 demodulates the data having the code rate modulated by BPSK (Binary Phase Shift Keying) modulation by detecting a change in a polarity of the $P_I$ component of the correlation result. Then, the microprocessor 124 determines the time when the satellite emits the GPS signal from the measured phase difference between the pseudorandom noise code from the pseudorandom noise code generator 116 and that from the received GPS signal and timings of the transmission data having 50 bps.

Moreover, the microprocessor 124 calculates a position of the antenna 102 of the GPS receiver using orbit data included in the transmission data, time information of a plurality of GPS satellites and measured time and outputs the position data.

Figure 2:
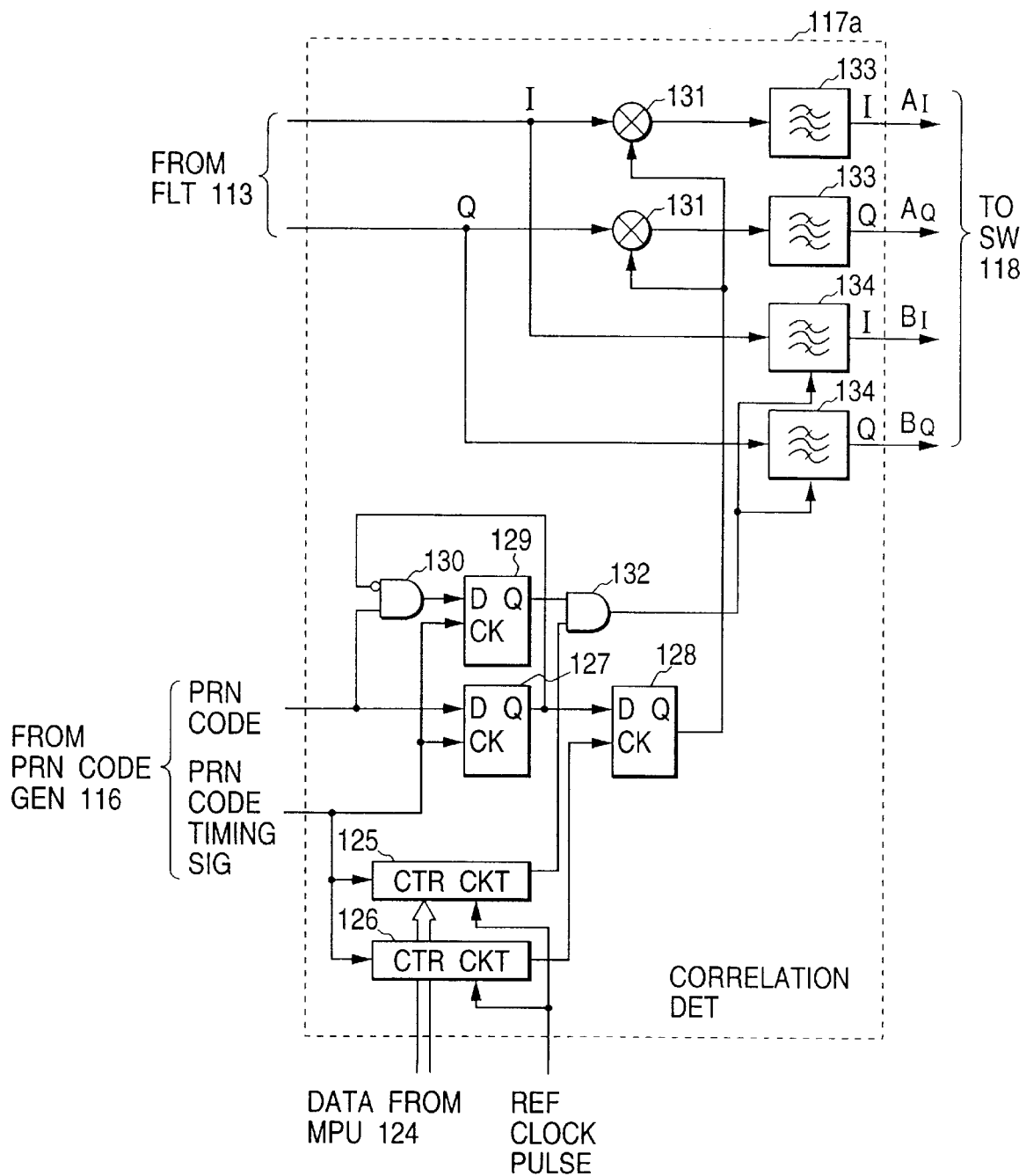
FIG. 2 is a block diagram of the correlation detector shown in FIG. 1.

FIG. 2 is a block diagram of the correlation detector 117a shown in FIG. 1. The correlation detector 117a comprises a counter circuit 125 for generating a timing signal leading or trailing the timing of the pseudorandom noise code from the pseudorandom noise code generator 116 by δ by the operation that it starts counting the reference clock pulses (signal) in response to a timing signal leading the pseudorandom noise code from the pseudorandom noise code generator 116 by eight reference clock pulses, a counter circuit 126 for generating the same timing as the pseudorandom noise code from the pseudorandom noise code generator 116, a D latch 127 for holding a level of the pseudorandom noise code generated by the pseudorandom noise code generator 116 for one chip period, a D latch 128 for holding the level of the pseudorandom noise code generated by the pseudorandom noise code generator 116 in response to a timing signal generated by the counter circuit 126, a D latch 129 for holding a level of a signal representing a transition of the pseudorandom noise code from 0 to 1 for the period from a earlier timing by about ½ chip period to a later timing by about ½ chip period than that the pseudorandom noise code changes, a logic circuit 103 for outputting "1" only when the pseudorandom noise code inputted into the correlation detector 117a shows "0" at a prior timing by one chip period and "1" at the present timing, mixers 131 for inverting the output signals from the filters 113 in accordance with a level of the pseudorandom noise code having the same timing as the pseudorandom noise code generator 116, an AND gate 132 for supplying a level of "1" to the filters 134 only when the pseudorandom noise code changes from "0" to "1", filters 133 for accumulating outputs of the filters 131 to output the signals $A_I$ and $A_Q$ smoothed by integration so that the sampling frequency corresponds to hundreds KHz, and filters 134 having an accumulating function for outputting signals $B_I$ and $B_Q$ derived by integrating and smoothing outputs of the filters 113 for a period corresponding to hundreds KHz in response to the outputting timing of the AND gate 132.

The microprocessor 124 changes the output timing δ of the counter circuit 125 by changing a value set to the counter circuit 125. That is, the timing δ prior to or behind the pseudorandom noise code can be provided by setting the data of the number of the reference clock pulses to be counted, i.e., −7 to 7.

FIGS. 3A to 3C, 4A and 4B show timing charts of the first embodiment for the correlation detector 117a shown in FIG. 1.

An operation of the correlation detector 117a will be described more specifically.

FIG. 3A shows a waveform of the pseudorandom noise code outputted by the latch 128 of which phase is to be finally controlled to the the pseudorandom noise code in the GPS signal. The mixers 131 inverts the I and Q GPS signals from the filters 113 when the output of the latch 128 is "0" and outputs them as they are when the output of the latch 128 is "1". The filters 113 output the signals $A_I$ and $A_Q$ smoothed as mentioned above. These signals are frequency-converted by the mixer 120 and accumulated by the accumulating circuit 3 to provide the correlation results $P_I$ and $P_Q$.

If the pseudorandom noise code generated by the pseudorandom noise code generator 116 agrees with the received pseudorandom noise code in the kind of pseud noise code and is substantially in phase with the received pseudorandom noise code, the received I and Q GPS signals is inverse-spectrum-spread by the mixers 131 and the mixers 131 outputs a phase shift keying signal which is BPSK-modulated at a code speed of 50 bps.

The microprocessor 124 tracks the carrier signal in the GPS signals by controlling the numerically controlled oscillator 119 such that the quadrature component $P_Q$ of the obtained correlation result becomes low and demodulates the phase shift keying signal by detecting the variation in polarity of the in-phase component $P_I$ of the correlation result and outputs time information and orbit data received from the GPS satellite.

The measurement of the phase difference between the pseudorandom noise codes from the GPS satellite 101 and from the pseudorandom noise code generator 116 is performed as follows:

FIG. 3B represents a waveform of the output of the latch 129 which shows "1" during a period that the pseudorandom noise code shown in FIG. 3A changes from "0" to "1". FIG. 3C shows the output signal of the AND gate 132. This timing signal has a phase difference from the edge of the output of the latch 128. The filters 134 accumulate the I and Q GPS baseband signals from the filters 113 in response to the output signal of the AND gate 132. That is, the I and Q GPS baseband signals are sampled in response to the timing signal from the AND gate 132 and their amplitudes are accumulated. During this operation, it is necessary to determine the period of the accumulation by the filter 134 such that the phase variation of the reproduced carrier signal generated by the numerically controlled oscillator 119 does not affect the measuring accuracy. Thus, in this embodiment, the accumulating period is determined so as to correspond to a sampling frequency of hundreds KHz.

It is assumed that the pseudorandom noise code generator 116 generates the same kind of noise codes and the numerically controlled oscillator 119 is tracking the carrier signal of the GPS signals. However, due to a variation in relative movement between the GPS satellite and the GPS receiver, a frequency error in the reference clock signal generator 114, or the like, a relative phase difference between the pseudorandom noise codes from the GPS satellite and the pseudorandom noise code generator 116 may change. However, the carrier signal in the GPS signal is in phase with the pseudorandom noise code in the GPS signal, so that when the numerically controlled oscillator 119 tracks the carrier signal, it is possible to maintain the phase difference between the pseudorandom noise code of the GPS satellite and the pseudorandom noise code of the GPS receiver within a half of a period of the carrier of the GPS signal by controlling the phase of the pseudorandom noise code from the pseudorandom noise code generator 116 in accordance with the phase variation of the numerically controlled oscillator 119.

Under the condition that the above-mentioned controlling is performed, the phase difference between the pseudorandom noise code from the GPS signal and the pseudorandom noise code generated by the pseudorandom noise code generator 116 is measured as follows:

It is assumed that the phase of the pseudorandom noise code from the pseudorandom noise code generator 116 leads the pseudorandom noise code from the GPS signal by three reference clock pulses.

The GPS signals from the filters 113 include the GPS signals from the target GPS satellite, other satellite signals, noise codes, and other interference signals or the like. On the other hand, the pseudorandom noise code generated by the pseudorandom noise code generator 116 maintains a phase relation (three reference clock pulses) from the pseudorandom noise code from the GPS signal. The timing signal from the AND gate 132 is near the transition of the pseudorandom noise code in the GPS signal under receiving from "0" to "1" and the phase of the GPS signal inverted around the timing when $\delta=3$.

The AND gate 132 outputs the timing signal about 255 times for 1 msec which is one period of the pseudorandom noise code and during one period of the pseudorandom noise code from the GPS signal under receiving shows the same pattern of polarity of the GPS signal. The the pattern of the polarity is changed in accordance with the data of 50 bps, so that the pattern changes every 20 msec. Other signals than the GPS signal under receiving have no correlation with the pseudorandom noise code generated by the pseudorandom noise code generator 116, so that averaging through repeating the detection cancels the other signals and the GPS signal under receiving can be detected independently.

Figure 4A:
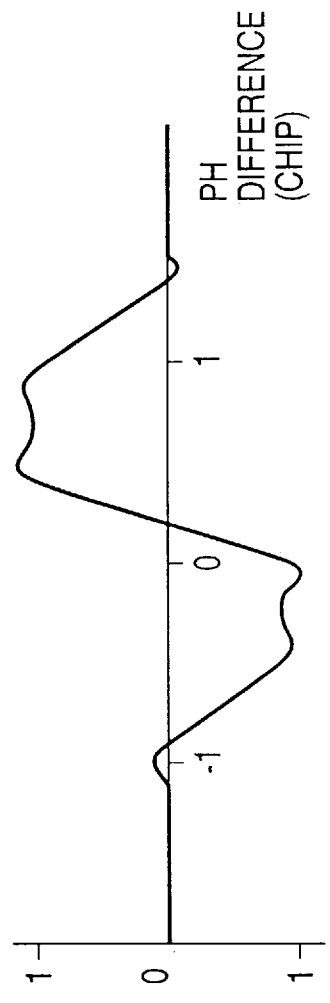

FIG. 4A is a graphical drawing of the first embodiment showing a variation of amplitude average $E_I$ with respect to a phase difference from the edge of the pseudorandom noise code from the pseudorandom noise code generator 116. Slopes in the variation of amplitude average $E_I$ on the negative and positive sides before and after the transition of the pseudorandom noise code from 0 to 1 for one chip period should be ideally constant. However, there are slight inclinations in the levels which are mainly caused by a characteristic of the filter 107. Before and after more than one chip period, there is no correlation between the output of the AND gate 132 and the pseudorandom noise code in the received GPS signal, so that the amplitude becomes zero. A polarity of the amplitude average $E_I$ is inverted in accordance with a value of the data transmitted from the GPS satellite.

Figure 4B:
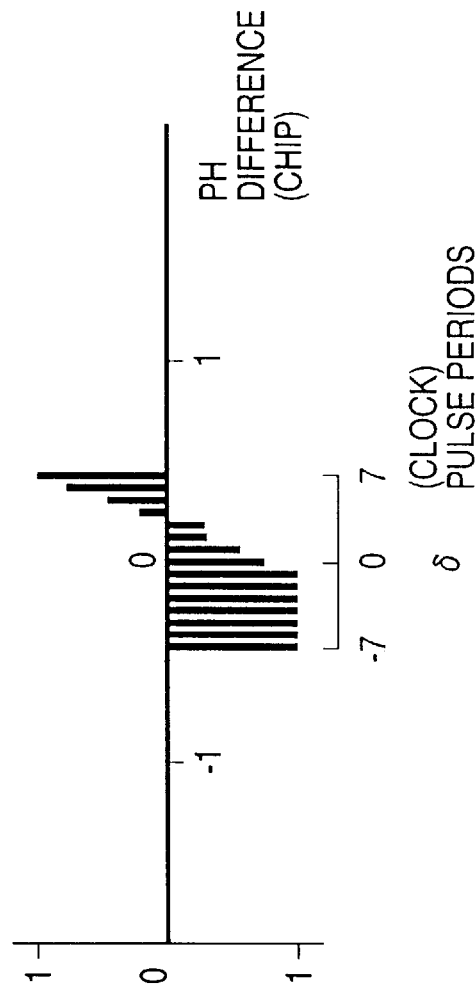

FIG. 4B is a graphical drawing showing a variation of sampled amplitude average if the amplitudes are sampled with the deviation $\delta$ fully changed.

An output timing of the counter circuit 125 is varied with a unit of the reference clock pulse, so that variation $\delta$ from $-7$ to $7$ provides fifteen values of the amplitude averages as shown in FIG. 4B. In the drawing, one chip period corresponds to sixteen reference clock pulses.

As shown in FIG. 4B, when $\delta=3$, the amplitude average $E_I$ is nearest to zero. Then, the microprocessor 124 judges this value as the phase difference in the pseudorandom noise code between the noise code generator 116 and the target GPS satellite. When $\delta=-7$, the microprocessor judges the polarigy of the amplitude. Then, the polarity of negative, so that the microprocessor 124 increase the value of $\delta$ and repeats the mesurement until the microprocessor 124 detects the sampling point at which the amplitude is near zero. Moreover, a more precise phase difference can be provided by interpolating from the amplitude averages $E_I$ before and after an inversion point of the amplitude average $E_I$.

As mentioned, at first, the phase difference between the carrier in the GPS signal and the reproduced carrier is detected from the correlation result $P_Q$ and the microprocessor 124 controls the numerically controlled oscillator 119 to make the reproduced carrier signals in phase with the carrier in the GPS signal and then, the phase of the pseudorandom noise code is maintained to have a phase difference less than a predetermined value in accordance with the variation in the phase of the numerically controlled oscillator 119 by setting phase control data to the pseudorandom noise code generator 116. Then, the amplitude averages $E_I$ of the pseudorandom noise code in the GPS signal are detected around the edge of the pseudorandom noise code generated by the pseudorandom noise code generator 116. From the amplitude average $E_I$ near zero, the fine phase difference is detected. The total phase difference is obtained by summing the phase difference set to the pseudorandom noise code generator 116 as the phase control data and the detected fine phase difference.

In FIG. 4A, the timing at which the amplitude average becomes zero delayed from the actual GPS signal due to the filter characteristic and a delay in the receiving circuit. However, the GPS signals from a plurality of GPS satellites have similar delays, so that there is almost no affection as far as time and position are determined from the detected phase difference including the same delay.

Moreover, the position that the amplitude average is zero is not affected by the amplitude of the GPS signal, so that the phase difference can be measured accurately. Further, the delay may be measured in advance and the measurement can be compensated by the detected delay.

In the above-mentioned description, it is assumed that the phase difference in the pseudorandom noise code between the GPS satellite and the pseudorandom noise code generator 116 ranges from $\delta=-7$ to $\delta=7$. When the GPS signal is initially caught, as a pre-processing, the frequency of the reproduced carrier signal and the phase of the pseudorandom noise code from the pseudorandom noise code generator 116 are successively changed to find the condition that the correlation results $P_I$ and $P_Q$ show maximum values. Moreover, it is also possible to effect the phase measurement mentioned above after the pseudorandom noise code is tracked by the Tau Dither method for a short interval at an initial stage when the GPS signal is caught.

<SECOND EMBODIMENT>

The GPS of the second embodiment has substantially the same structure as that of the first embodiment. The difference is that weighting circuits 202 are further provided to the correlation detector 117b. Other structure and operation are similar to the first embodiment. In the second embodiment, the phase difference is detected more accurately by weighting the amplitudes of the received GPS signal around the measuring point and weighted amplitudes are summed.

Figure 5:
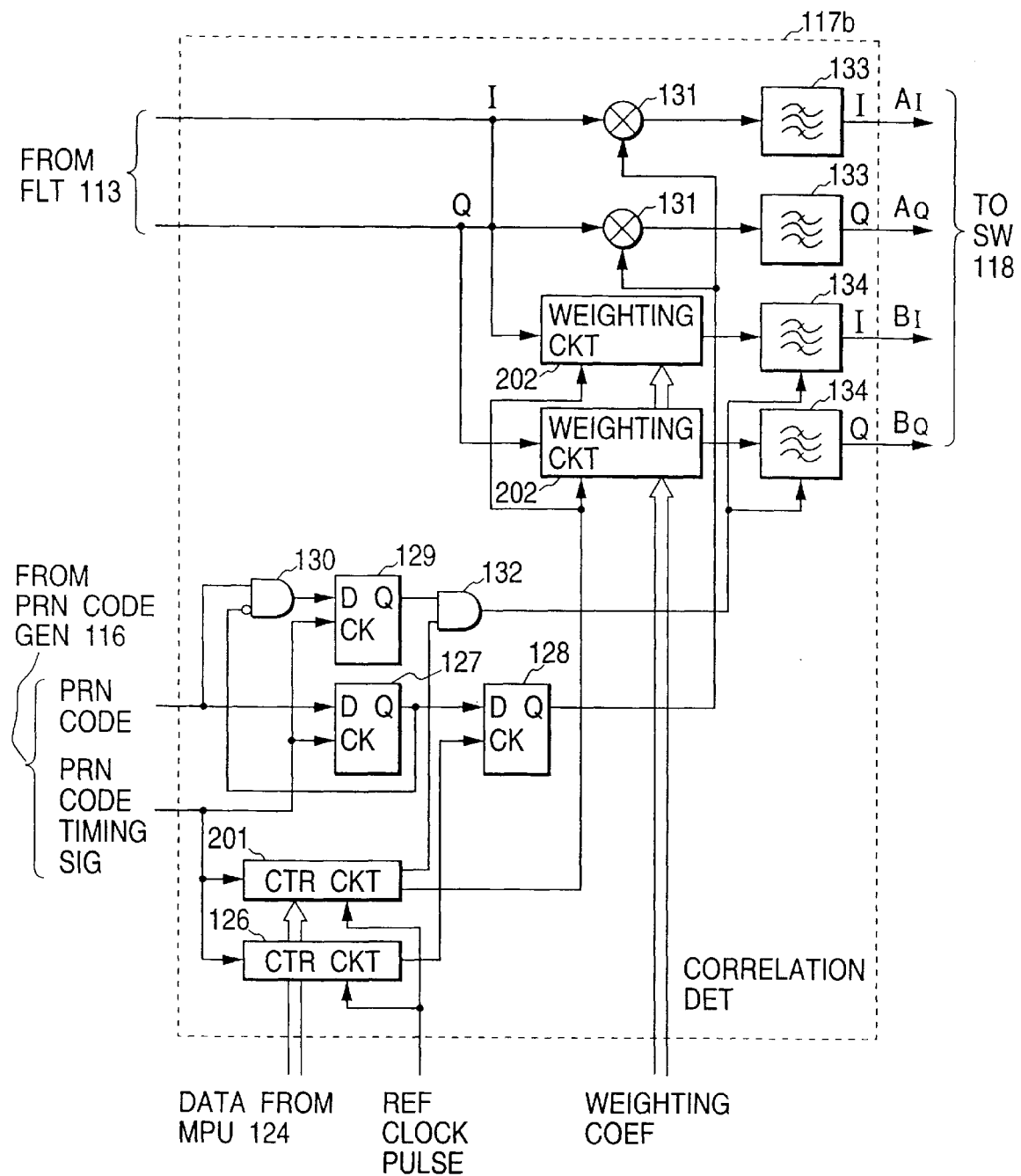
FIG. 5 is a block diagram of a correlation detector of a second embodiment.

FIG. 5 is a block diagram of the correlation detector 117b of the second embodiment.

In FIG. 5, weighting circuits 202 are further provided between the filters 113 and the filters 134 and the microprocessor 124 supplies coefficient data to the weighting circuits 202. Moreover, the counter circuit 201 supplies a timing signal including two successive pulses to the AND gate 132 and data for identifying the two successive pulses to the weighting circuits 202.

The counter circuit 201 starts counting at the timing prior to the edge of the pseudorandom noise code from the pseudorandom noise code generator 116 by eight reference clock pulses and generates the timing signal at the timing deviation $\delta$ leading or trailing the pseudorandom noise code and at the timing of the following reference pulse, that is, the timing $\delta+1$, the following timing pulse is generated and identifying data for identifying the timing of the following timing pulse is supplied to the weighting circuits 202. The AND gate 132 outputs the timing pulse and the following timing pulse around the timing of the transition of the pseudorandom noise code from the pseudorandom noise code generator 116. The weighting circuits 202 multiply the GPS baseband signals from the filters 113 by the coefficients from the microprocessor 124. The filters 134 smooths the outputs of the weighting circuits 202 through integration to output signals $B_I$ and $B_Q$.

The microprocessor 124 generates the phase control data and supplies it to the pseudorandom noise code generator 116 in accordance with the phase variation in the numerically controlled oscillator 119 tracking the carrier of the GPS signal. The microprocessor 124 quantizes the phase difference with a unit of a period of the reference clock pulse (one sixteenth of the chip period) and supplied the integer portion of the quantized value to the pseudorandom noise code generator 116 as the phase control data and omits the figures below the first place of decimals.

Then, an interval corresponding to the omitted value is added to the timing at the sampling timing around the edge of the pseudorandom noise code. The added value is quantized with a unit of one sixteenth of one chip period as $\delta$ and its remainder is R. The value of $\delta$ is set to the counter circuit 201 and the value of R is used to determine the weighting coefficients.

The counter circuit 201 starts counting at the timing prior to the edge of the pseudorandom noise code from the pseudorandom noise code generator 116 by eight reference clock pulses and generates the timing signal (pulse) at the timing deviation $\delta$ leading or trailing the pseudorandom noise code and at the timing of the following reference pulse, that is, the timing $\delta+1$, the following timing pulse is generated and identifying data is supplied to the weighting circuit 202. The AND gate 132 outputs the timing pulse and the following timing pulse around the timing of the transition of the pseudorandom noise code from the pseudorandom noise code generator 116. The weighting circuits 202 multiply the GPS baseband signals from the filters 113 by the coefficients from the microprocessor 124 in response to the timing pulse and the following timing pulses respectively. The filters 134 smooths the outputs of the weighting circuits 202 through integration to output signals $B_I$ and $B_Q$.

FIGS. 6A to 6C illustrate an operation of the correlation detector 117b of the second embodiment.

FIG. 6A shows the pseudorandom noise code outputted by the latch 128 which phase is to be compared with that of the pseudorandom noise code in the GPS signal. FIG. 6B shows the timing signal and the following timing signal generated by the AND gate 132 wherein $\delta=3$ for example.

The microprocessor 124 supplies a weighting coefficient corresponding to (1.0−R) for the data sampled at the sampling timing with the deviation $\delta$ and a weighting coefficient corresponding to R for the data sampled at the timing with the deviation $\delta+1$ to the weighting circuits 202.

The weighting circuits 202 multiply the amplitudes of the GPS baseband signals sampled at $\delta$ by the coefficient corresponding to (1.0−R) and multiply the amplitudes of the GPS baseband signals sampled at $\delta+1$ by the coefficient corresponding to R and supplies the results to the filters 134 respectively.

The filter 134 sums these outputs. The filter 134 repeats similar operations and acclimates or integrates the results for an interval corresponding to hundreds KHz and outputs smoothed signals $B_I$ and $B_Q$.

FIG. 6C shows amplitudes $e_{IE}$ and $e_{IL}$ at the timing $\delta$ and $\delta+1$ on the simultaneous variation $e_I$ of the GPS baseband signal. The chain line represents the GPS signal with the carrier removed as similarly shown in FIG. 4A, wherein the timing when the level is zero is to be detected as the phase difference by the microprocessor 124.

In the example shown in FIG. 6C, it is assumed that the received GPS signal includes no noise component and the frequency of the carrier has no amplitude and no phase difference at the filters 113. Then, the quadrature components $e_{QE}$ and $e_{QL}$ become zero.

The actual received GPS signal includes the carrier having a frequency zero to several KHz to tens KHz (in accordance with a relative speed between this GPS receiver and GPS satellite or a frequency error in the reference clock signal) and noise components. Therefore, the instantaneous value of the GPS signal is subjected to the frequency conversion by the filters 134 and the mixer 120 and the acclimating by the adder 122 and the RAM 123 to provide amplitude averages $E_I$ and $E_Q$ of the pseudorandom noise code having the period of 1 msec.

During the accumulating, the microprocessor 124 controls the numerically controlled oscillator 119 to track the carrier of the GPS signal. When the phase of the reproduced carrier varies, the microprocessor 124 controls the phase of the pseudorandom noise code using this phase variation at a higher accuracy than the period of the reference clock pulse and changes the phase of the pseudorandom noise code generator 116, the value of $\delta$, and the value of R to provide a predetermined phase condition.

As mentioned, in the GPS receiver of the second embodiment, the phase difference is detected through interpolation, so that a more accurate phase measurement can be provided.

<THIRD EMBODIMENT>

A GPS receiver of a third embodiment samples the received pseudorandom noise code at both of rising and falling edges.

Figure 7:
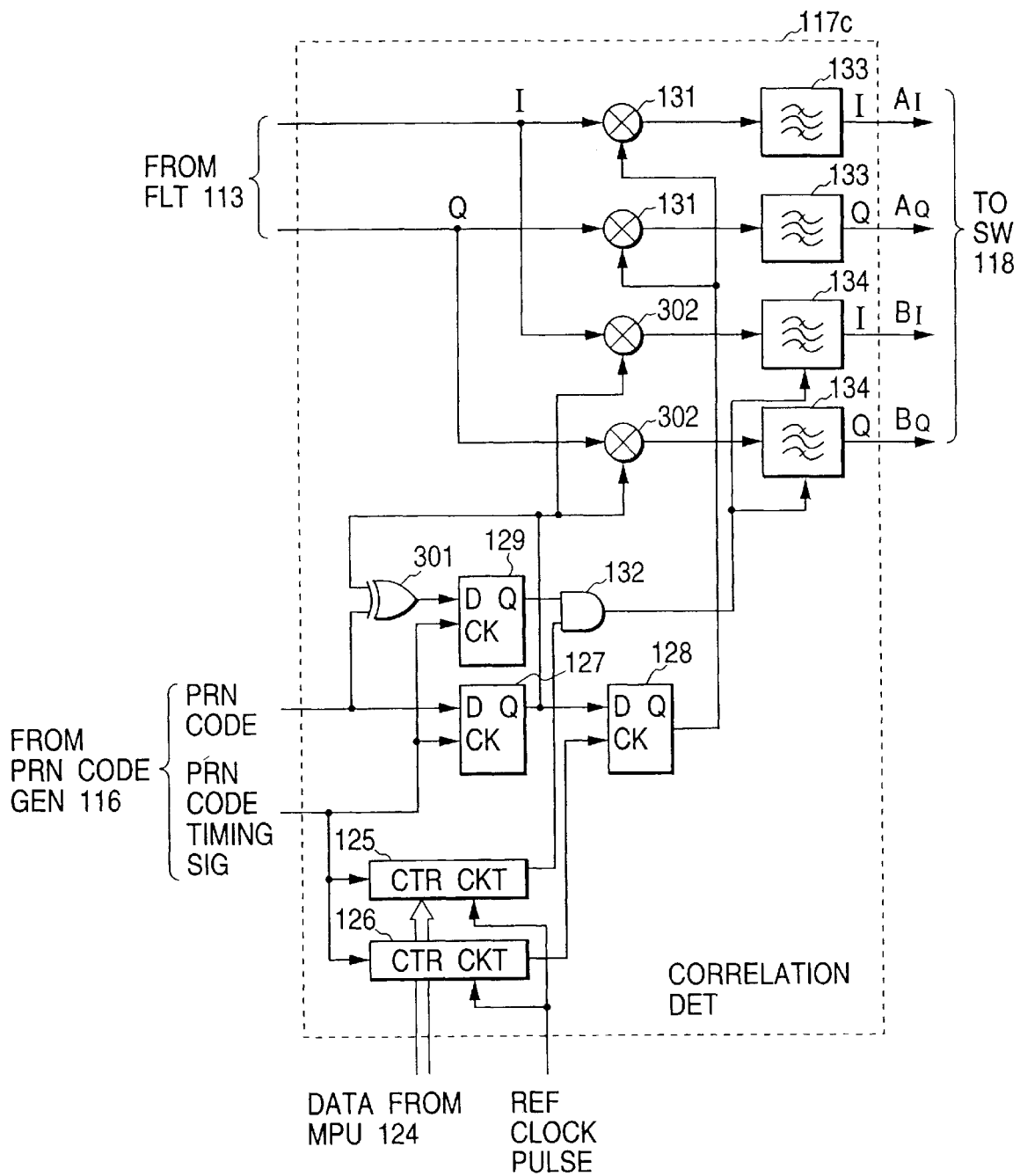
FIG. 7 is a block diagram of the correlation detector of the third embodiment.

The GPS receiver of the third embodiment has substantially the same structure as that of the first embodiment. The difference is in the correlation detector 117c. FIG. 7 is a block diagram of the correlation detector 117c of the third embodiment. FIGS. 8A to 8E are graphical drawings of the third embodiment showing waveforms at respective outputs in the correlation detector 117c.

The correlation detector 117c has substantially the same structure as the correlation detector 117a of the first embodiment shown in FIG. 2. The difference is that the logic circuit 301 including EXCLUSIVE OR circuit replaces the logic circuit 130 and mixers 302 are further provided between the filters 113 and the filters 134 respectively.

The logic circuit 301 outputs "1" only when the pseudorandom noise code inputted into the correlation detector 117c transients from "1" to "0" or "0" to "1" between the present chip period and one chip prior period. The mixers 302 output the output signals of the filters 113 as they are when the output of the latch 127 is "1" and output the output signals of the filters 113 with the polarities inverted when the output of the latch 127 is "0" respectively.

An operation of the correlation detector 117c will be described with FIGS. 8A to 8E.

Figure 8:
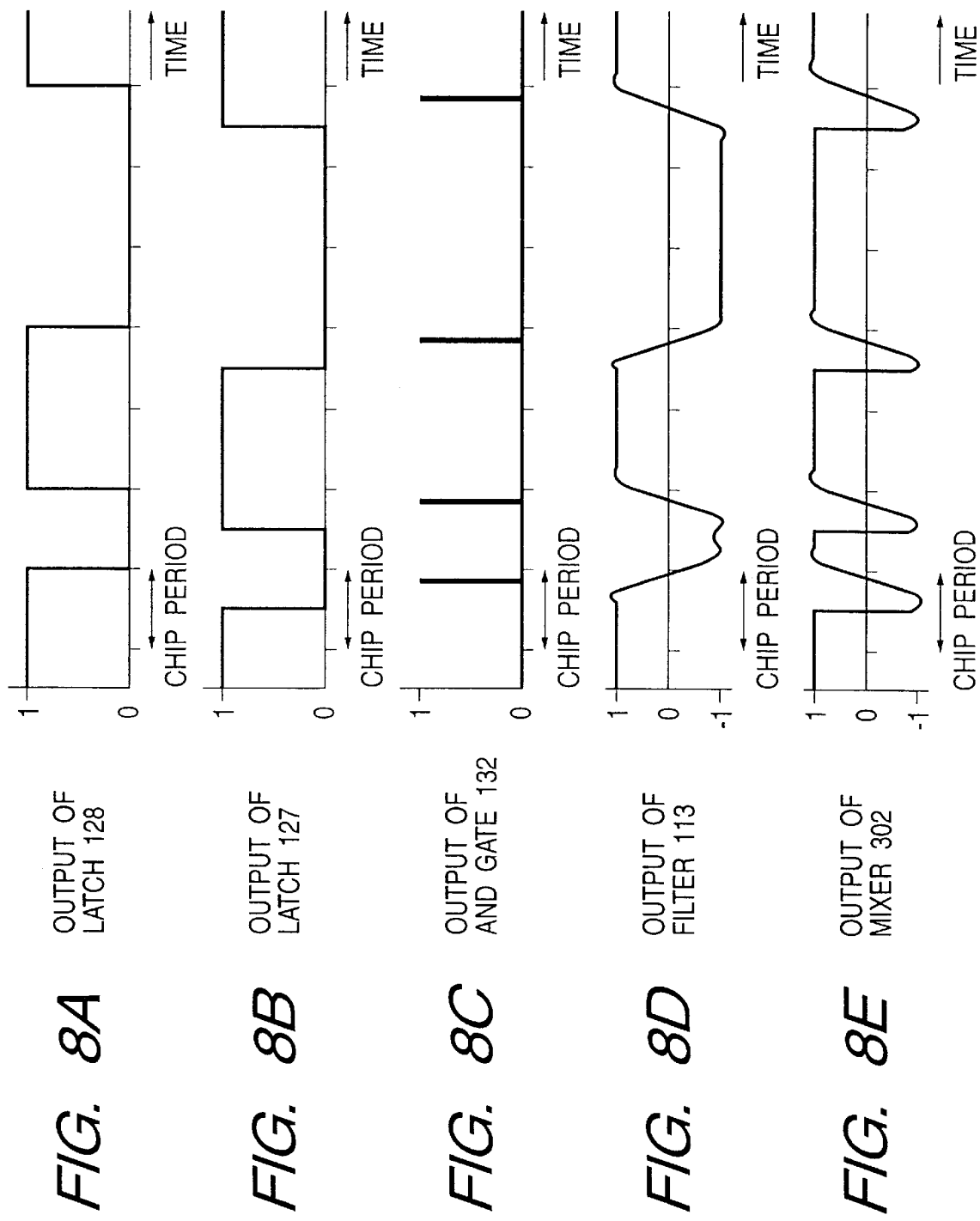
FIGS. 8A to 8E are graphical drawings of the third embodiment showing waveforms at respective outputs in the correlation detector.

FIG. 8A shows a waveform of the pseudorandom noise code outputted by the latch 128. FIG. 8B shows a waveform of an output signal of the latch 127 which represents rising and falling edge periods of the pseudorandom noise code from the pseudorandom noise code generator 116 and leads the pseudorandom noise code outputted by the latch 128 by a half of the chip period. In this respect, actually, the pseudorandom noise code generator 116 generates the pseudorandom noise code leading the pseudorandom noise code of the received GPS signal because of the presence of the latch 127 or the like.

The logic circuit 301 outputs "1" only when the pseudorandom noise code from the pseudorandom noise code generator 116 transients and the latch 129 holds the result. The AND gate 132 outputs the timing signal from the counter circuit 125 only for the rising and falling edge period of the pseudorandom noise code. FIG. 8C shows the output of the AND gate 132, wherein the microprocessor 124 supplies data to the counter circuit 125 to output the timing signal at the deviation δ=2 from the counter circuit 125.

FIG. 8D shows a waveform of the GPS signal from the filter 113. The mixers 302 output the I and Q GPS signals from the filters 113 as they are when the output of the latch 127 is "1", and output the I and Q GPS signals with their polarities inverted when the output of the latch 127 is "0". FIG. 8E shows an output of the mixer 302. In these drawings, it is assumed that a frequency and the phase difference of the carrier signal in the received GPS signal are zero and noise components are not considered. The filters 134 acclimate the outputs of the mixers 302 shown in FIG. 8E at the timings shown in FIG. 8C.

As shown in FIGS. 8C and 8E, the filters 134 samples the same points of rising edges having similar shapes of the I and Q GPS signals because the filter 113 are a kind of liner elements, so that the rising edges and the falling edges of the GPS signal show substantially the same response with polarities inverted at the rising and falling edges.

The filters 134 accumulate the outputs of the mixers 302 for an interval corresponding to a sampling frequency of hundreds KHz. During this operation, there are about 511 sampling points shown in FIG. 8C for the period of pseudorandom noise code of 1 msec, so that there are the sampling points which are twice that of the first embodiment. As the result, a S/N ratio can be improved by about 3 dB and the phase difference can be detected a shorter interval.

The outputs of the filters 134 are subjected to the demodulation by the mixer 120 to remove the carrier if the carrier frequency at the filters 113 is not zero.

<FOURTH EMBODIMENT>

A GPS receiver of a fourth embodiment detects the phase difference from an amplitude measurement of the GPS signal for a longer interval.

Figure 9:
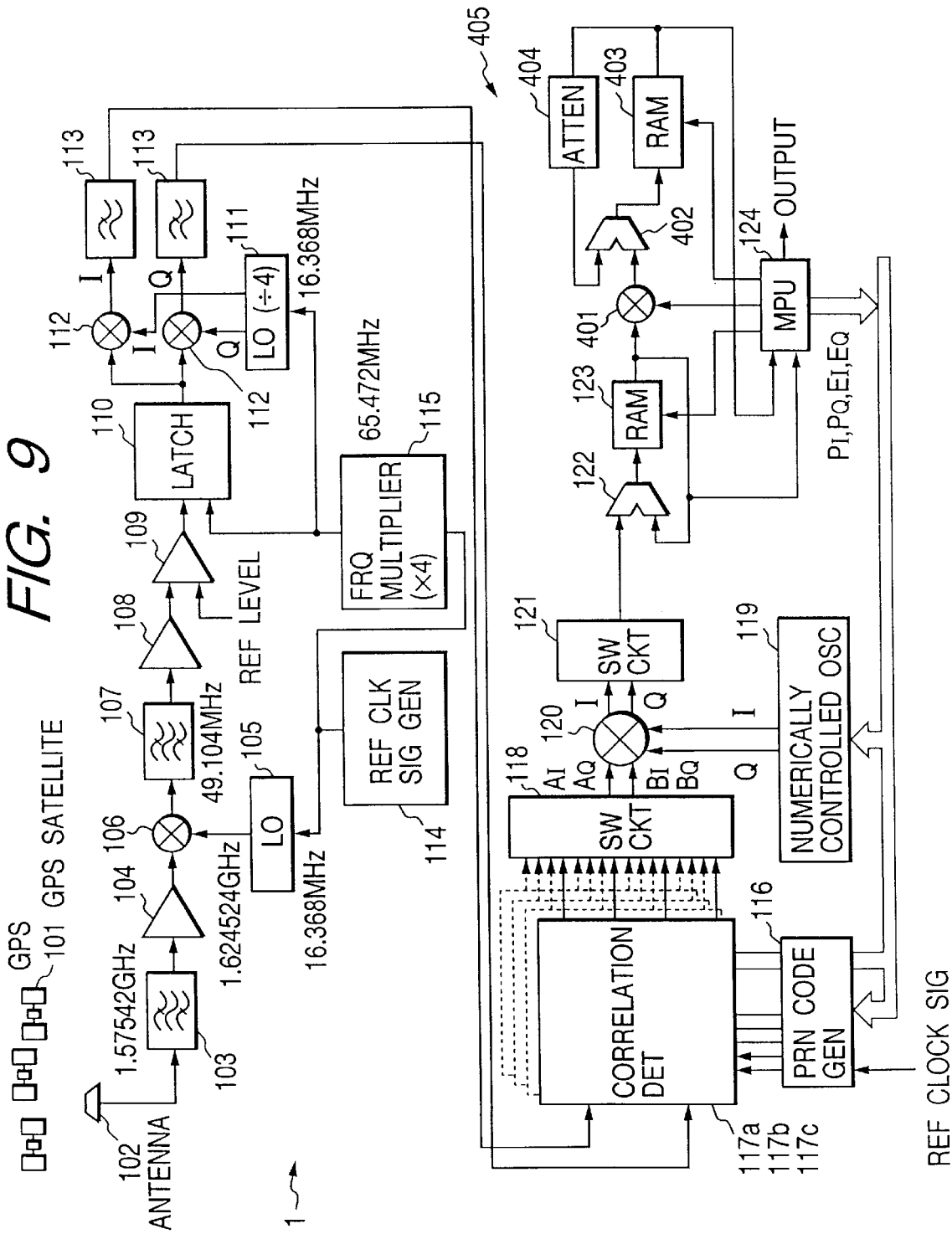
FIG. 9 is a block diagram of a GPS receiver of a fourth embodiment.

FIG. 9 is a block diagram of the GPS receiver of the fourth embodiment. The GPS receiver of the fourth embodiment has substantially the same structure as that of the first embodiment. The difference is that a lowpass filtering circuit 405 including a mixer 401, adder 402, a RAM 403, and an attenuator 404 are further provided.

The mixer 401 outputs the results of the RAM 123 as they are when the correlation result $P_I$ is positive and outputs the results with their polarity inverted when the correlation result $P_I$ is negative. The adder 402 accumulates the outputs of the mixer 401 every GPS satellites. The RAM 403 stores the results of the adder 402. The attenuator 404 attenuates the results from the adder 402 through the RAM 403 and supplies the attenuated values to the adder 402.

The accumulator including the adder 122 and the RAM 123 accumulates the outputs of the switch 121 every GPS satellite every 1 msec period. The outputs of the accumulator are the correlation results $P_I$ and $P_Q$ and amplitude averages $E_I$ and $E_Q$ as similar to the first embodiment.

The microprocessor 124 controls the mixer 401 such that the amplitude average $E_I$ for the period of 1 msec is supplied as it is to the lowpass filter 405 including the adder 402, the RAM 403, and the attenuator 404 when the correlation result $P_I$ for the same period is positive and supplies the amplitude average $E_I$ for the period as its polarity inverted to the lowpass filter 405 when the correlation result $P_I$ for the same period is negative.

The adder 402 adds the amplitude average $E_I$ to the attenuated value from the attenuator 402 and the result is stored in the RAM 403, the stored result is supplied to attenuator 404 and to the microprocessor 124. The attenuator 404 attenuates the result from the RAM 403 and supplies the attenuated result to the adder 402 as mentioned above for accumulation. The accumulated result from the RAM 403 shows a smoothed value with variation components suppressed.

A cut off frequency of the lowpass filter 405 including the adder 402, the RAM 403, and the attenuator 404 is set to 0.001 Hz for example by controlling the accumulation times, so that the lowpassed result shows a high accuracy in the measurement of the amplitude averages $E_I$ every GPS satellite without affection by noise.

In the lowpass filter 405, noise components are cancelled as the amplitude average $E_I$ is accumulated with its polarity inverted in accordance with the correlation result $P_I$, so that a high accuracy can be provided.

<FIFTH EMBODIMENT>

A GPS receiver of a fifth embodiment detects the amplitude averages at different timings substantially at the same time.

In the above-mentioned embodiments, the amplitude averages $E_I$ are detected to determine the phase difference with the deviation δ varied every completion of the measurement of the amplitude average $E_I$. On the other hand, in this embodiment the amplitude is successively sampled around the zero-cross timing of the pseudorandom noise code in the GPS signal with the deviation δ successively varied. Moreover, the amplitude average is determined by two successive sampling points with the values of the amplitudes weighted and summing them.

Figure 10:
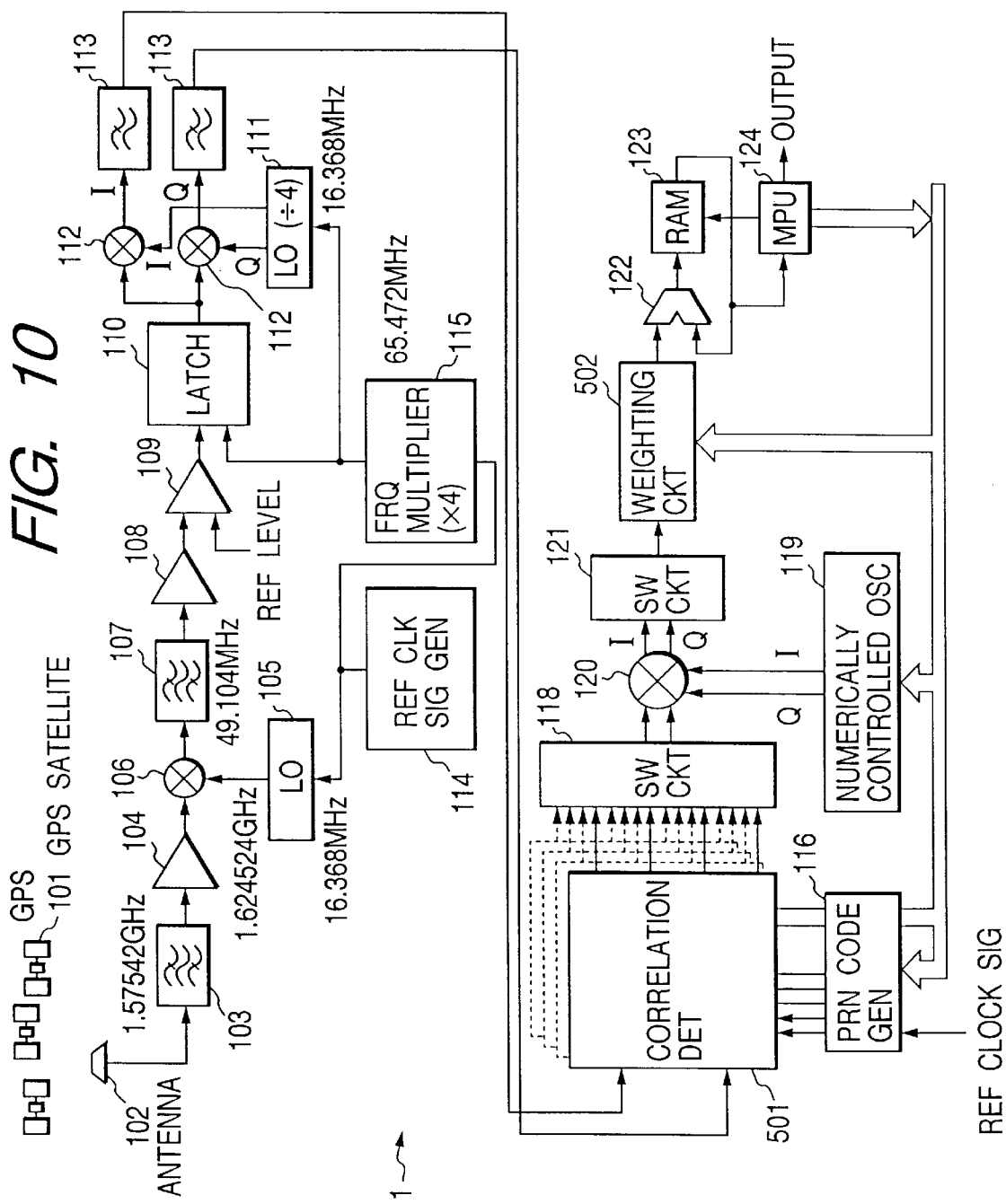
FIG. 10 is a block diagram of a GPS receiver of a fifth embodiment.
Figure 11:
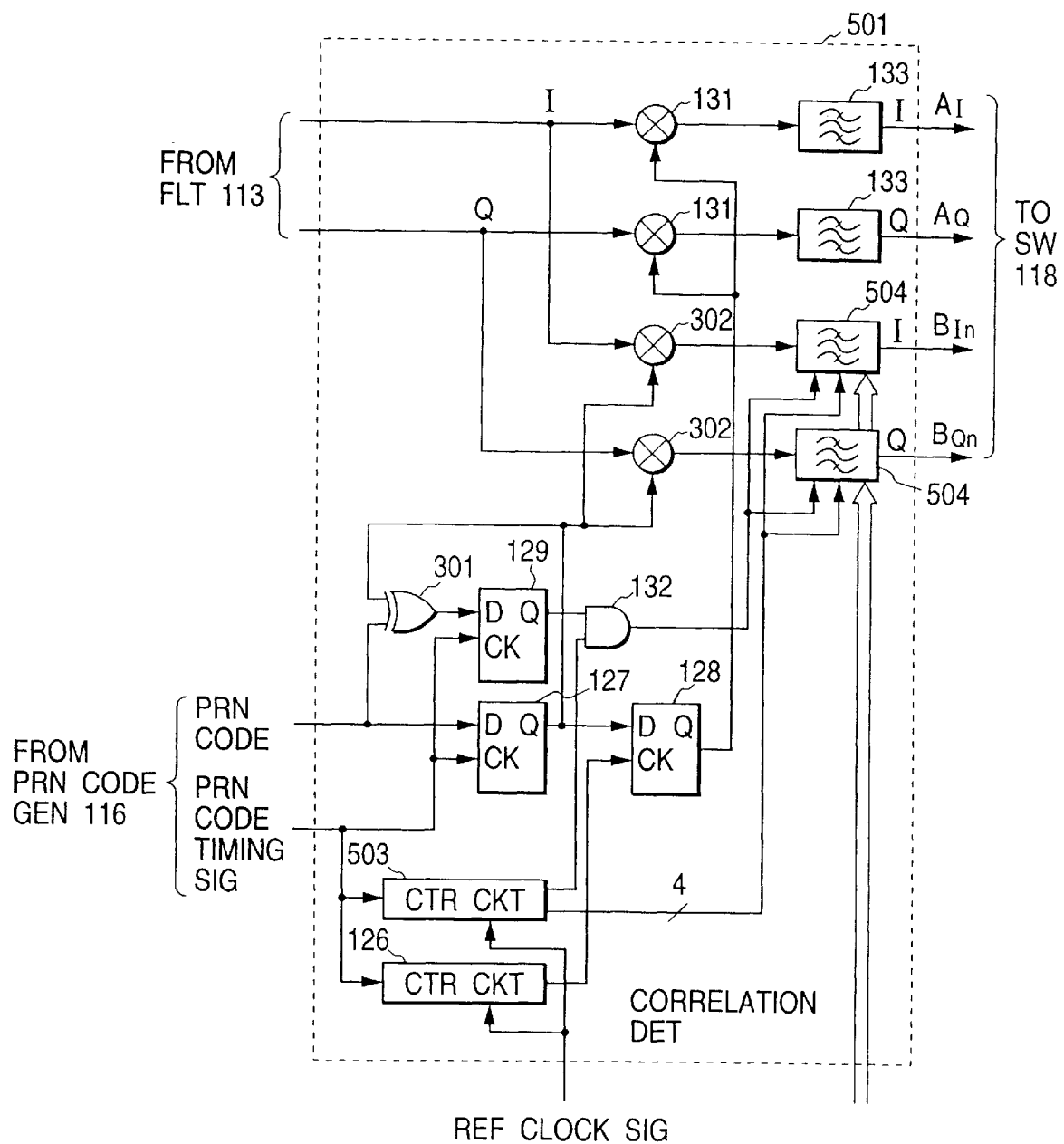
FIG. 11 is a block diagram of the correlation detector shown in FIG. 10.

FIG. 10 is a block diagram of the GPS receiver of the fifth embodiment. FIG. 11 is a block diagram of the correlation detector shown in FIG. 10.

The GPS receiver of the fifth embodiment has substantially the same structure as that of the first embodiment. The difference is that a correlation detector 501 replaces the correlation detector 117, a weighting circuit 502 is further provided between the switch 121 and the adder 122, the microprocessor 124 generates weighting coefficients for the weighting circuit 502.

The correlation detector 501 mixes the GPS signal with the pseudorandom noise code from the pseudorandom noise code generator 116 to measure the correlation every GPS satellite and samples the received GPS signal at timings just before and after the pseudorandom noise code generated by the pseudorandom noise code generator 116 transients from 0 to 1 or 1 to 0. The weighting circuit 502 weights the sampled data from the correlation detector 502 via the switch 118 and mixer 120 and the switch 121 by coefficient data from the microprocessor 124.

The correlation detector 501 has a structure shown in FIG. 11 which is similar to the correlation detector 117c of the third embodiment shown in FIG. 7. The difference in that a counter circuit 503 replaces the counter circuit 125 and the filters 504 replaces the filters 134.

The counter 503 generates fifteen timing pulses in response to the reference clock pulse from the timing prior to the edge of the pseudorandom noise code from the pseudorandom noise code generator 116 by seven reference clock pulses.

The filters 504 sample amplitudes of the GPS signals from the filter 113 in response to the fifteen timing pulses and respectively accumulate the sampled amplitudes at every sampling timing and output averages $B_I n$ and $B_Q n$ (n is an integer from −7 to 7).

The mixers 302 invert the polarities of GPS signals from the filter 113 in accordance with whether the pseudorandom noise code transients from 0 to 1 or 1 to 0, which is similar to the third embodiment.

The filters 133 accumulate the correlation results between the I and Q GPS signals with the pseudorandom noise code from the pseudorandom noise code generator 116 and output smoothed signals $A_I$ and $A_Q$.

The signals $A_I$ and $A_Q$ are quadrature-frequency converted by the numerically controlled oscillator 119 and the mixer 120. The quadrature-frequency converted signals are outputted by the weighting circuit 502 as they are and accumulated by the adder 122 and the RAM 123 and outputted as the correlation results $P_I$ and $P_Q$.

The microprocessor 124 controls the numerically controlled oscillator 119 such that the correlation result $P_Q$ becomes lower every GPS satellite to track carriers of GPS satellites.

The operation of the GPS receiver hereinafter will be described assuming that one GPS signal is being tracked.

The microprocessor 124 stores and controls the phase of the pseudorandom noise code from the pseudorandom noise code generator 116 as the phase control data and renews the phase control data of the pseudorandom noise code generated by the pseudorandom noise code generator 116 with an accuracy higher than the reference clock pulse period using the phase variation of the reproduced carrier signal by the numerically controlled oscillator 119, wherein the phase in the pseudorandom noise code generator 116 is controlled with a unit of the reference clock pulse. Because the phase of the carrier signal of the GPS signal relates to the phase of the pseudorandom noise code of the GPS signal, according to this processing, the phase difference between the pseudorandom noise code of the GPS signal and the pseudorandom noise code from the pseudorandom noise code generator 116 under control by the microprocessor 124 is maintained constant within a wavelength of the carrier wave having a wavelength of 19 cm.

It is also assumed that to initially catch the GPS signal, the processing for detecting the condition that the correlation results $P_I$ and $P_Q$ become large by successively change the frequency of the reproduction carrier signal and the phase of the pseudorandom noise codes signal generated by the pseudorandom noise code generator 116 has been completed and that the phase difference of the pseudorandom noise code is less than 7/16 chips.

The microprocessor 124 quantizes the phase of the pseudorandom noise code controlled therein with the reference clock pulse period which is one sixteenth of the chip period and supplies the quotient as the phase control data to the pseudorandom noise code generator 116 to determine the phase of the pseudorandom noise code generated therein and to obtain the remainder R ($0 \leq R < 1/16$).

The correlation detector 501 samples the I and Q GPS signals from the filters 113 at the timings from seven reference clock pulse prior to the transition of the pseudorandom noise code from the pseudorandom noise code generator 116 from 0 to 1 or from 1 to 0 and accumulates the sampled data to output smoothed signals $B_{In}$ and $B_{Qn}$ (n is an integer from −7 to 7) as mentioned above.

The smoothed signals $B_{In}$ and $B_{Qn}$ are quadrature-frequency-converted by the numerically controlled oscillator 119 and the mixer 120 to remove the carrier components in the GPS signal and output signals $C_{In}$ and $C_{Qn}$.

In this GPS receiver, the amplitude averages $E^{Im}$ (m is an integer from −6 to 6) of the GPS signal are detected using the signal $C^{In}$ at thirteen different timings deviating from the phase of the pseudorandom noise code controlled by the microprocessor 124 by −6/16 chip periods to 6/16 chip periods with 1/16 chip period interval. Then, as similar to the second embodiment, the amplitude averages $E_{Im}$ are detected by an average from every two consecutive timings of thirteen different timings. However, in this GPS receiver, respective signals $C_{In}$ are detected substantially at the same time, so that the amplitude averages $E_{Im}$ at the thirteen different timings simultaneously.

The weighting circuit 502 weights th signal $C_{In}$ in phase with the carrier by the weighting coefficient data for every GPS satellite from the microprocessor 124. The accumulator including the adder 122 and the RAM 123 accumulates the amplitude average $E_{Im}$.

The amplitude averages $E_{Im}$ are determined by weighting the signal $C_{Im}$ by coefficient data corresponding to (1−R) and weighting the signal $C_{Im+1}$ by coefficient data corresponding to the remainder R and summing them and accumulating the summed values. This represented by the following equation.

$$E_{Im} = \Sigma\{(1-R)\cdot C_{Im} + R\cdot C_{Im+1}\}$$

wherein M=−6, −5, . . . , 0, 1, . . . , 6.

As mentioned, the amplitude averages $E_{Im}$ of the GPS signal can be obtained at different successive timings having constant phase relations with not only the pseudorandom noise code from the pseudorandom noise code generator 116 but also the pseudorandom noise code from the GPS satellite.

The microprocessor 124 determines the timing at which the amplitude average $E_{Im}$ shows 0 from the measurement results at the different timings and determines the phase difference between the phase of the pseudorandom noise code controlled by the microprocessor 124 and the pseudorandom noise code in the GPS signal. Then, the microprocessor 124 outputs the phase difference data by summing this phase difference and the phase controlled by the microprocessor 124 as the measurement result of the phase of the pseudorandom noise code in the GPS signal.

If any one of the amplitude averages $E_{Im}$ is not 0, the measurement result is obtained by interpolation from the amplitude averages $E_{Im}$ across the 0 level with an accuracy less than 1/16 chip periods. Therefore, the phase difference between the phase of the pseudorandom noise code controlled by the microprocessor 124 and the phase of the pseudorandom noise code in the GPS signal can be measured with an high accuracy for a short interval, if the phase difference of the pseudorandom noise code at the initial stage after the GPS signal can be caught is less than 7/16 of the chip periods.

Moreover, the microprocessor 124 stores the data of phase difference in the RAM therein or the RAM 123 every measurement of the phase difference, so that repeated measurements can improve the accuracy in the detection of the phase difference. Therefore, the phase difference measurement is provided at a high accuracy for a short interval.

In the above-mentioned measurement, the amplitudes of the GPS signal are detected at different timings substantially at the same time, so that an intensity of the received GPS signal does not vary substantially, which provides no affects the accuracy in the phase difference measurement. Therefore, the averaging for a long interval is not necessary.

<SIXTH EMBODIMENT>

The GPS receiver of a sixth embodiment can detects an affection due to multi-path by storing data of a receiving characteristic measured in advance in a good condition and comparing the present measurement with the stored data.

Figure 12:
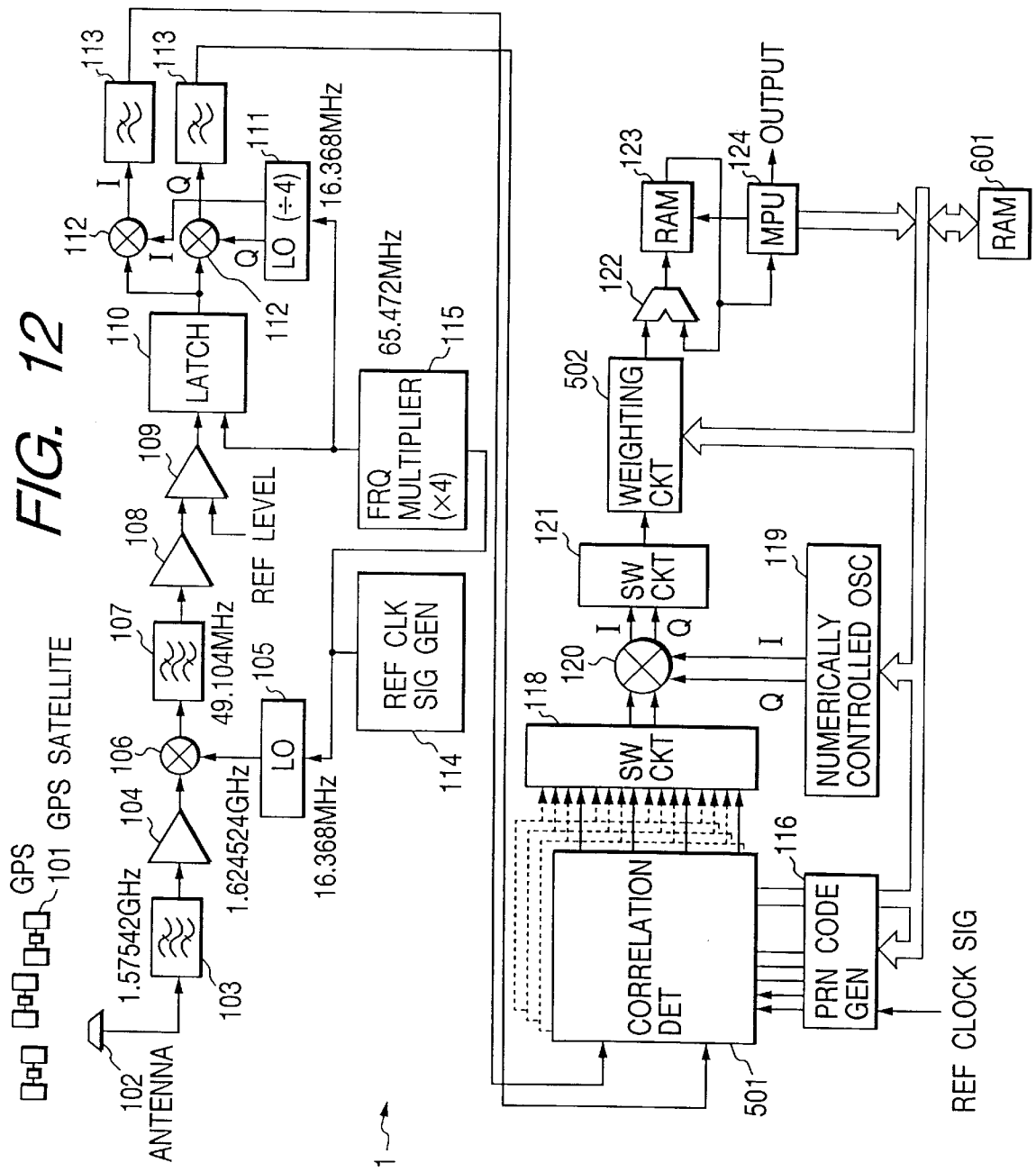
FIG. 12 is a block diagram of a GPS receiver of a sixth embodiment.

FIG. 12 is a block diagram of the GPS receiver of the sixth embodiment.

The GPS receiver has substantially the same structure as that of the fifth embodiment. The difference is that a RAM 601 for storing data of a receiving characteristic measured in advance in a good condition and the microprocessor 124 controls the data. That is, the microprocessor 124 stores data of a characteristic that the amplitude average $E_{Im}$ of the GPS signal varies with the phase difference between the pseudorandom noise code of the GPS signal and the pseudorandom noise code from the pseudorandom noise code generator 116. The RAM 601 comprises non-volatile memory chips capable of storing data in a power off state.

The microprocessor 124 measures the amplitude of the GPS signal at timings around the edge of the pseudorandom noise code from the pseudorandom noise code generator 116 as similar to the fifth embodiment when an elevation angle of the target GPS satellite is relatively high, an intensity of the GPS signal is sufficient, and there are sufficient numbers of correlation detectors 501 compared with the number of the GPS satellites to be received.

In the fifth embodiment, the amplitude variation of the GPS signals was detected around the edge timing of the pseudorandom noise code from the pseudorandom noise code generator 116 for about one chip period. In the sixth embodiment, the amplitude variation is detected over two chip periods. It is desirable to detect the amplitude variation for a longer interval at the same time. However, it is also possible that only one of the correlation detectors 501 detects the amplitude variation for a longer interval at the same time to save a cost. Moreover, it is also possible that the amplitude variation is performed twice with timings shifted and then, two sets of the amplitude variation detection are combined.

Figure 13A:
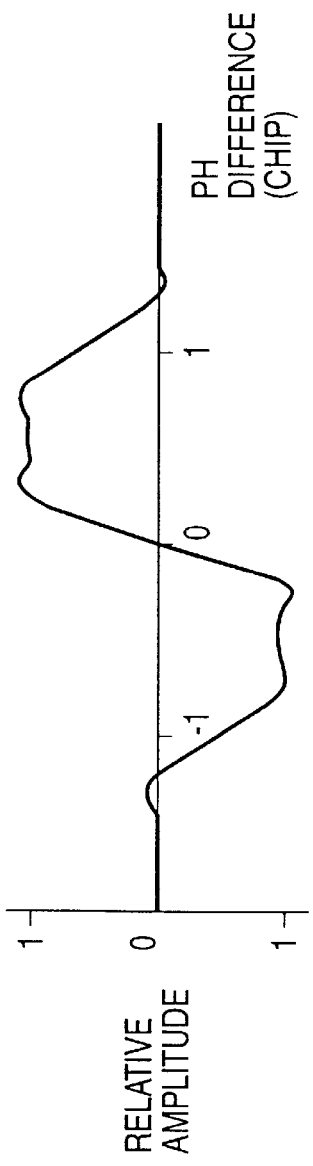
FIGS. 13A to 13C show waveforms of the sixth embodiment showing amplitude variations to be stored.
Figure 13B:
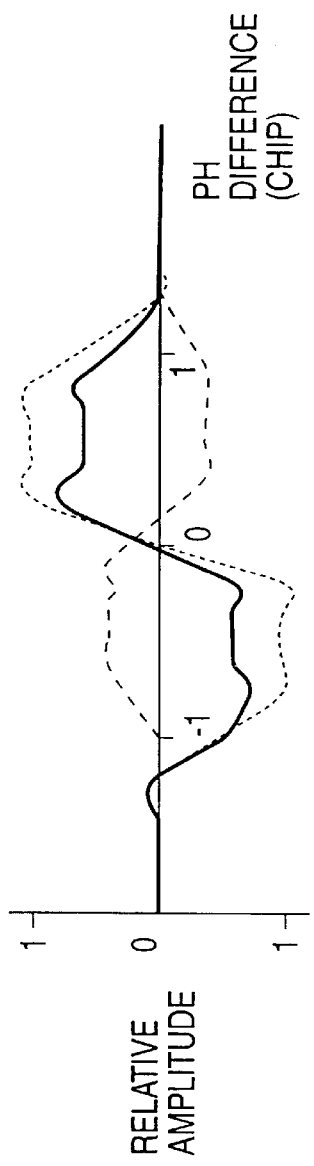
Figure 13C:
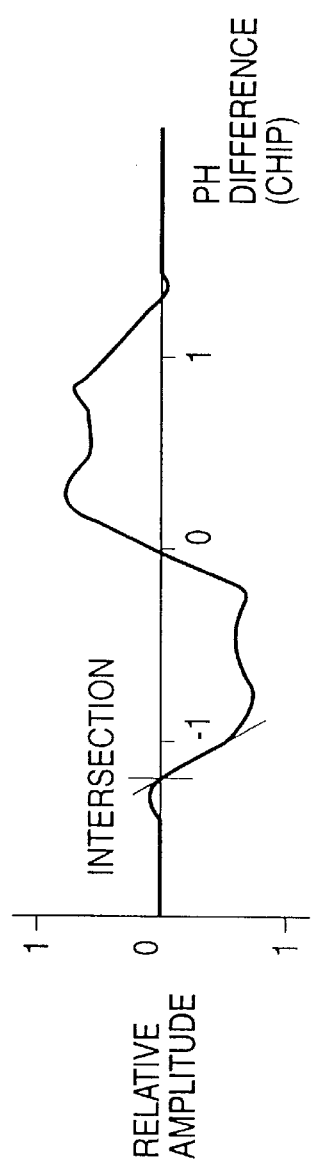

FIGS. 13A to 13C show waveforms of the sixth embodiment showing amplitude variations to be stored.

FIG. 13A shows the amplitude variation in the condition that there is no multipath phasing. In this amplitude variation, if the correlation detectors, etc. are linear, the passband of the filter 107 is sufficiently broader than 2 MHz, a falling characteristic around the phase difference −1 is substantially the same as a rising characteristic around the phase difference of 1 and the rising characteristic around the phase difference of zero has an inverted inclination and the amplitude is twice that of the falling characteristic portion. Therefore, an affection by a multipath phasing can be estimated by comparing this rising and falling characteristics with those obtained in the actual conditions. FIG. 13B shows an amplitude variation affected by the multipath phasing, wherein the chain lines represents direct waves and reflected waves, and the solid line represents combined waves which is clearly different from the amplitude variation shown in FIG. 13A.

The microprocessor 124 judges the condition of the amplitude detection in accordance with the characteristic as mentioned above. If the microprocessor 124 judges the condition of the amplitude detection that there is few affection by the multipath phasing with a sufficient accuracy from the amplitude characteristic compared with the amplitude characteristic in advance in a good condition, the microprocessor 124 calibrates the detected amplitude variation such that the zero cross timing exists at the center of the amplitude variation and the amplitude values can be dealt easily. Then, the microprocessor 124 stores the data of the calibrated amplitude variation in the RAM 601. Moreover, the microprocessor 124 stores the phase difference between the phase of the pseudorandom noise code and the pseudorandom noise code of the GPS signal as a first phase difference measurement value.

Then, the microprocessor 124 determines weighting coefficient data for $C_{Im}$ and $C_{Im+1}$ using the amplitude characteristic with respect to the variation in the phase difference stored in the RAM 601 and the first phase difference measurement value in place of the (1.0−R) and R used to for weighting $C_{Im}$ and $C_{Im+1}$ in the fifth embodiment. Then, the microprocessor 124 measures the amplitude variation of the GPS signal around the edge timing of the pseudorandom noise code from the pseudorandom noise code generator 116 over two chip periods again.

Because an accuracy of weighting in this measurement is higher than that of the first measurement, the amplitude characteristic and the phase difference to the variation of the phase difference can be measured at a high accuracy. Then the microprocessor 124 estimates the measurement result with respect to the multipath and the accuracy of the phase difference. If the microprocessor 124 judges the measurement condition to be good, the microprocessor 124 calibrates the timing and the amplitude of the measurement result and stores the calibrated result in the RAM 601.

When the position of the GPS receiver is detected, the microprocessor 124 measures the phase of the pseudorandom noise code of the GPS signal. During this measurement operation, the microprocessor 124 compares the measurement result of the amplitude characteristic with respect to the variation of the phase difference obtained in this measurement with the amplitude characteristic with respect to the variation of the phase difference stored in the RAM 601 and the microprocessor 124 estimates a multipath affection.

If the multipath affection is little, the microprocessor 124 judges that the phase control data for the pseudorandom noise code controlled by the microprocessor 124 and the phase of the phase difference of the pseudorandom noise code of the GPS signal are measured at a sufficient accuracy and the microprocessor 124 stores the data of the phase difference. Then, the microprocessor 124 adds the phase control data controlled by the microprocessor 124 to the phase difference measured and outputs the result as the measurement result for the position measurement.

On the other hand, if the multipath affection is much, the accumulated values obtained in this measurement are initialized. Moreover, if there is the phase difference data previously measured in a good condition, the microprocessor 124 continuously uses this value in the measurement of the phase of the pseudorandom noise code. If there is no phase difference data previously measured, the presently measured phase difference is used for the measurement of the phase of the pseudorandom noise code. However, the microprocessor 124 reflects this result including much error in determining the position of the GPS receiver.

If the accuracy of the measurement of the phase difference between the phase of the pseudorandom noise code controlled by the microprocessor 124 and the phase of the pseudorandom noise code of the GPS signal becomes less than 1/256 of the chip period in the phase measurement of the pseudorandom noise code in the position measurement, the value of the phase difference is continuously used for the phase measurement and the microprocessor 124 initializes the accumulated values in this measurement and this phase difference is treated as a first phase difference measurement value in the following measurement.

That is, as described in the measurement of the characteristic stored in the RAM 601, in place of the weighting coefficient data (1.0−R) and R, the microprocessor 124 determines the weighting coefficient data by interpolation using the amplitude characteristic with respect to the variation of the phase difference stored in the RAM 601 and the first phase difference measurement value and the microprocessor 124 measures the phase difference between the pseudorandom noise code controlled by the microprocessor 124 and the pseudorandom noise code of the GPS signal at a high accuracy.

Moreover if it takes twenty seconds from the start of the phase difference measurement, the accuracy of the measurement is Judged to be sufficient, and the multipath affection is Judged to be little by the microprocessor 124, the phase difference presently measured can be replaced by the first phase difference measurement value. In this case, the weighting coefficient data is also set again and the microprocessor 124 measures the phase difference with the set weighing coefficient data. This measurement has a higher accuracy of than that the first measurement, the phase difference can be obtained at a high accuracy, so that the accuracy in the position measurement can be further improved.

FIG. 13B shows the amplitude characteristic with respect to the variation of the phase difference measured with a reference to the pseudorandom noise code generated by the pseudorandom noise code generator 116 in a condition that there is a multipath affection. In FIG. 13B, the directly received wave leads the reflected wave, both being represented by chain lines and generally, the directly received wave has a higher intensity than the reflected wave.

As clearly shown in FIG. 13B, the phase difference which is represented by the point where the amplitude variation characteristic with respect to the variation of the phase difference crosses the zero level shifts from the zero-cross point of the directly received wave. In order to measure the phase difference with the multipath affection reduced, it is general to measure the phase difference in the amplitude characteristic to the variation of the phase difference around the point that the phase difference of the pseudorandom noise code is zero. However, in the condition that the amplitude of the received GPS is high and there is the multipath affection, it is better to perform the measurement around the point having a phase difference −1.

In this case, the microprocessor 124 detects a point on the amplitude characteristic where its inclination is higher than other points, obtains a tangent line at the point and obtains an intersection point between the tangent line and the zero level, and then, obtains the phase difference there. FIG. 13C shows this operation. From FIG. 13B, there is a tendency that the position where the tangent line intersects the zero level, that is, the intersection, is not largely affected by the multipath.

The microprocessor 124 also obtains the phase difference by determining the tangent line on the amplitude characteristic stored in the RAM 601 and the zero-cross point of the tangent line. Then, the microprocessor 124 determines the phase difference between the pseudorandom noise code controlled by the microprocessor 124 and the pseudorandom noise code of the GPS signal from the difference between the measured phase of the tangent line on the measured amplitude characteristic and the phase of the tangent line on the stored amplitude characteristic.

A modification will be described.

In the modification, the microprocessor 124 assumes amplitudes and phases of the directly received wave and the reflected wave. The microprocessor 124 obtains an amplitude characteristic to be measured using the amplitude characteristic stored in the RAM 601 on the basis of the assumed phase and amplitude. The microprocessor 124 adjusts the assumed phases and amplitudes of the directly received wave and the reflected wave such that the amplitude characteristic to be measured matches the amplitude characteristic presently measured.

As mentioned, in the GPS receiver according to the sixth embodiment, the amplitude averages are measured at difference timings around the edge of the pseudorandom noise code from the pseudorandom noise code generator 116 substantially at the same time and the amplitude characteristic obtained from the measured amplitude averages is stored in the RAM 601 if the receiving condition is good. Therefore, the multipath affection can be readily estimated by comparing the presently measured amplitude characteristic with the stored amplitude characteristic. If there is a multipath affection, the microprocessor 124 adaptively provides the phase difference and informs of the decrease in the measurement accuracy.

Moreover, in this GPS receiver, it is possible to determine the weighting coefficient data again using the phase difference between the amplitude characteristic of the received GPS signal stored in the RAM 601 and the phase of the presently measured pseudorandom noise code, so that the position measurement can be provided with a high accuracy.

Moreover, there is a low multipath affection around the timing prior to the edge of the pseudorandom noise code by about one chip period. Thus, the GPS receiver according to this embodiment, the phase of the pseudorandom noise code of the GPS signal is measured around that timing, so that the measurement accuracy is not largely affected by the multipath phasing.

Moreover, in the GPS receiver according to this embodiment, the directly received wave which is not affected by the multipath phasing can be determined by assuming the phases and amplitudes of the directly received wave and the reflected wave.

Generally, the Global Positioning (GPS) is operated by the National Military Establishment. However, the term "GPS" is used as all navigation satellite systems including GLONASS satellite operated by Russia for example.

In the first and second embodiments, the timing signal for sampling the amplitudes of the GPS signal is generated around the rising edge of the pseudorandom noise code generated by the pseudorandom noise code generator 116. However, it is also possible that the timing signal is generated around the falling edge of the pseudorandom noise code generated by the pseudorandom noise code generator 116.

In the fourth embodiment, the attenuator 404 is used. However, the attenuator 404 can be omitted to provide an integrator in place of the lowpass filter. Moreover, the polarity detection and the polarity inversion processing can be collectly performed every unit interval of 20 msec in in phase with data transmission timings of the data having 50 bps from the GPS satellite.

In the fifth embodiment, the phase of the pseudorandom noise code generated by the pseudorandom noise code generator 116 is not changed in accordance with the measurement result. However, after the phase of the pseudorandom noise code can be measured accurately, it is also possible to correct the phase of the pseudorandom noise code controlled by the microprocessor 124 and the phase difference measurement result of the pseudorandom noise code at the same time.

In the sixth embodiment, only in the case that there is the multipath affection, the phase difference around the timing prior to the edge of the pseudorandom noise code generated by the pseudorandom noise code generator 116 by one chip period are determined. However, it is also possible to measure the phase differ always.

What is claimed is:

1. A GPS receiver comprising:

receiving means for receiving a GPS (Global Positioning System) signal from a GPS satellite including transmission data, a first pseudorandom noise code signal assigned to said GPS satellite, and a first carrier signal and generating I and Q GPS signals;

pseudorandom noise noise code signal generation means responsive to phase control data and a clock pulse signal for generating a second pseudorandom noise code signal corresponding to said first pseudorandom noise code signal;

carrier signal generation means for generating a second carrier signal corresponding to said first carrier signal;

correlation detection means for providing correlation results $P_I$, $P_Q$ from said I and Q GPS signals, said second carrier signal, and said second pseudorandom noise code signal;

frequency control means for controlling said carrier signal generation means in accordance with said correlation result $P_Q$ to track a frequency and phase of said first carrier signal with respect to said second carrier signal;

phase control means for supplying said phase control data to said pseudorandom noise code signal generation means to reduce a first phase difference between said first and second pseudorandom noise code signals in accordance with said correlation result $P_Q$ which is obtained while said frequency control means is tracking said frequency and phase of said first carrier signal;

timing pulse generation means responsive to said phase control means for detecting an edge of said second pseudorandom noise code signal and generating a timing pulse with a deviation δ from a timing of the detected edge;

sampling means for sampling amplitudes of said I and Q GPS signals at a sampling timing in response to said timing pulse;

accumulating means for accumulating values of the sampled amplitudes to provide amplitude averages $E_I$ and $E_Q$;

second phase difference detection means for judging whether said sampling timing agrees with the detected edge in accordance with said amplitude averages $E_I$ and $E_Q$ and for repeatedly controlling said timing pulse generation means, sampling means, and said averaging means with said deviation δ changed around said timing of said edge, for outputting phase difference data when said sampling timing substantially agrees with the detected edge in accordance with said amplitude averages $E_I$ and $E_Q$;

phase difference data outputting means for summing said phase control data and phase difference data and outputting the summing result; and data detection means for detecting and outputting transmission data from said correlation result $P_I$.

2. A GPS receiver as claimed in claim 1, wherein said timing pulse generation means is further responsive to said clock pulse and generates a second timing pulse following said timing pulse at a second sampling timing with an interval corresponding to said clock period, said GPS receiver further comprising:

weighting coefficient generation means for generating first and second weighting coefficients in accordance with said sampling timing and said second sampling timing; and weighting means for weighting said I and Q baseband GPS signals by said first and second weighting coefficients, wherein said accumulating means sums said weighted I and Q baseband GPS signals and accumulates the summing result.

3. A GPS receiver as claimed in claim 1, wherein said timing pulse generation means generates said timing pulse and a second timing pulse in response to a rising edge and a falling edge of said second pseudorandom noise code signal respectively and further generates an edge period signal indicating of periods of said rising edge and falling edges of said second pseudorandom noise code signal, said GPS receiver further comprising, inverting means for inverting said I and Q GPS signals for said period of said falling edge and supplying outputs thereof to said sampling means, said sampling means sampling said amplitudes of said I and Q GPS signals in response to said timing pulse and said second timing pulse.

4. A GPS receiver as claimed in claim 1, further comprising:

inverting means for inverting said amplitude average $E_I$ and outputting when said correlation result $P_I$ is negative and outputting as it is when said correlation result $P_I$ is not negative; and averaging means for averaging said amplitude averages $E_I$ and $E_Q$ from said inverting means for a transmission period of said GPS signal and supplies an average to said second phase difference detection means to provide said variation.

5. A GPS receiver as claimed in claim 1, wherein said second phase difference detection means controls said timing pulse generation means generates a train of said timing pulses such that said deviation δ successively varied around said timing of said edge, said sampling means samples said amplitudes of said I and Q GPS signals in response to said train of timing pulses, and said accumulating means averages values of the sampled amplitudes every timing pulses of said train and outputs said phase difference data when said sampling timing of any of said timing pulse in said train substantially agrees with the detected edge in accordance with said amplitude averages $E_I$ and $E_Q$.

6. A GPS receiver as claimed in claim 5, further comprising:

weighting coefficient generation means for generating first and second weighting coefficients in accordance with said sampling timings of each pair of two consecutive sampling pulses of said train; and weighting means for weighting said I and Q baseband GPS signals sampled in response to each pair of said two consecutive sapling timings by said first and second weighting coefficients, wherein said accumulating means sums said weighted I and Q baseband GPS signals sampled in response to each pair of two consecutive sampling pulses and accumulates the summing results of each pair of two consecutive sampling pulses as said amplitude averages $E_I$ and $E_Q$.

7. A GPS receiver as claimed in claim 5, further comprising:

storing means for storing data of a variation of said averaged $E_I$ sampled in response to said train of timing pulses; and comparing means for comparing data of said variation presently derived with the stored variation of said averaged $E_I$.

8. A GPS receiver as claimed in claim 6, further comprising:

storing means for storing data of a variation of said averaged $E_I$ sampled in response to said train of timing pulses; and comparing means for comparing data of said variation presently derived with the stored variation of said averaged $E_I$.

9. A GPS receiver as claimed in claim 7, further comprising: judging means for judging that an accuracy of said detected second phase difference is higher than a reference, wherein said weighting coefficient generation means generates said weighting coefficient using said detected second phase difference having said accuracy higher than said reference, the stored variation of said averaged $E_p$, timings of sampling used for obtaining said variation, and timings for sampling said variation to be detected.

10. A GPS receiver as claimed in claim 7, wherein said timing pulse generation means successively generates said timing pulses with said deviation δ varied before said timing of the detected edge by more than one chip period and said storing means stores said variation, said GPS receiver further comprising:

tangent line detection means for detecting a tangent line on a curve of said variation having a higher inclination; and calculation means for calculating an intersecting point with a predetermined level of said amplitude, said storing means storing said intersecting point, said second phase difference detection means detecting said second phase difference from a difference between the intersecting point presently provided and the intersecting point stored in said storing means.

11. A GPS receiver as claimed in claim 7, further comprising:

assuming means for assuming a first phase and said variation of a first component of said first pseudorandom noise code signal which directly arrives at said receiving means and a second phase and said variation of second component of said first pseudorandom noise code signal which indirectly arrives at said receiving means in accordance with the stored variation; and third phase difference detection means for adjusting the assumed first and second phases and variations of said detecting phases and variations of said first and second components such that said said assumed first and second phases and variation of said first and second components correspond to the presently detected variation.

* * * * *